Nov. 13, 1956 R. W. WAYMAN 2,770,148
TRANSMISSION
Filed Oct. 2, 1951 6 Sheets-Sheet 1

Inventor:
Robert W. Wayman
By Keith J. Blewer
Atty.

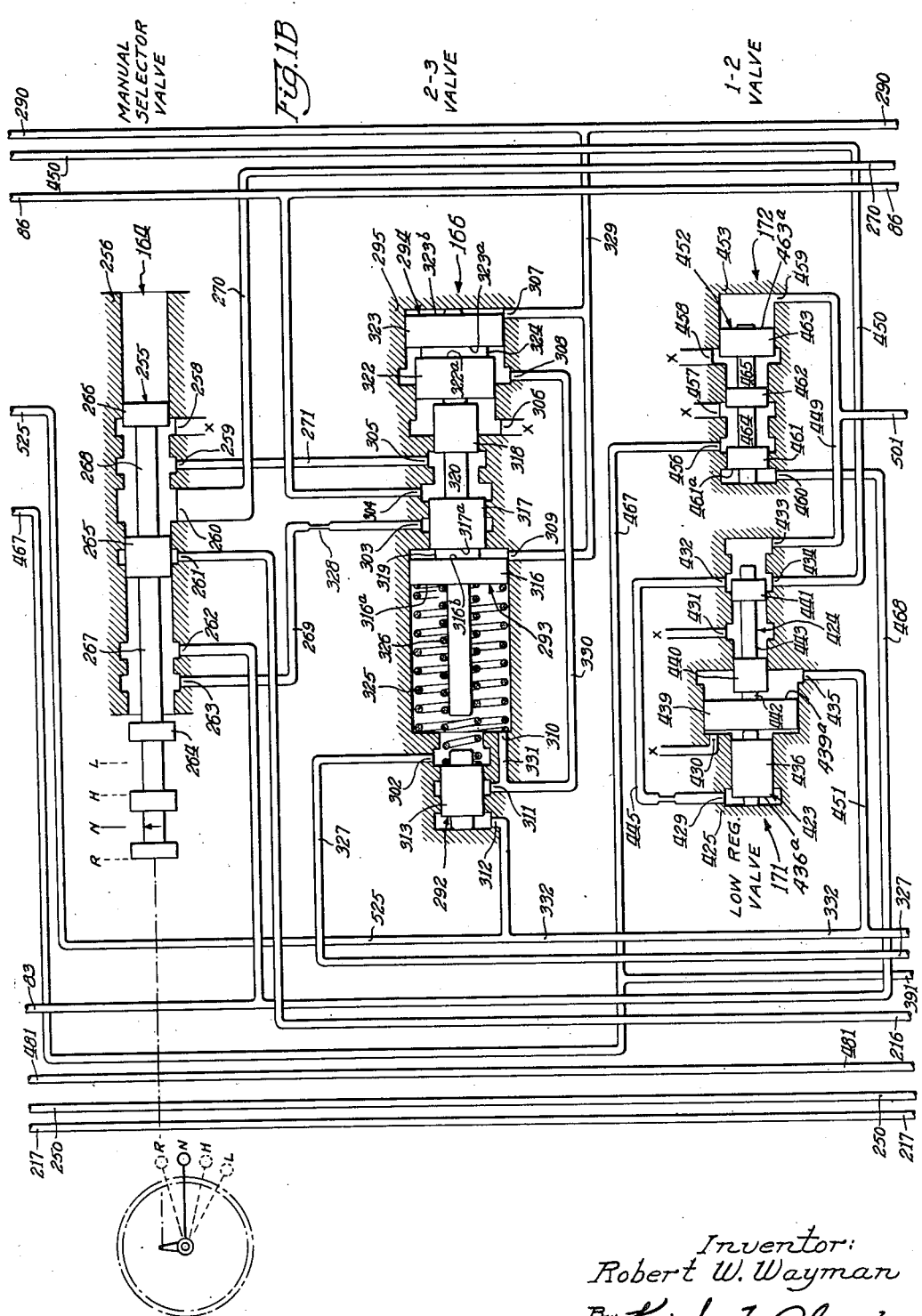

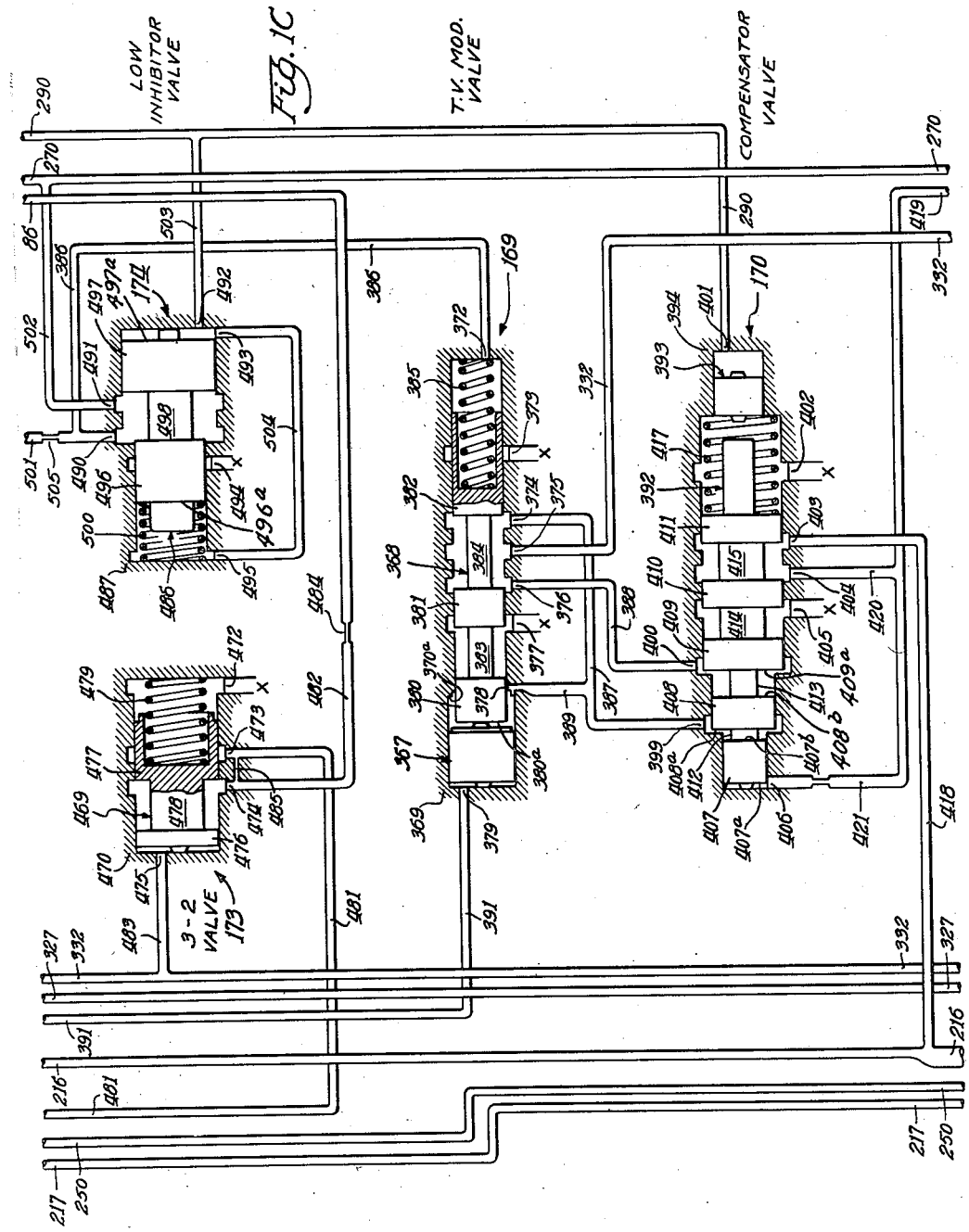

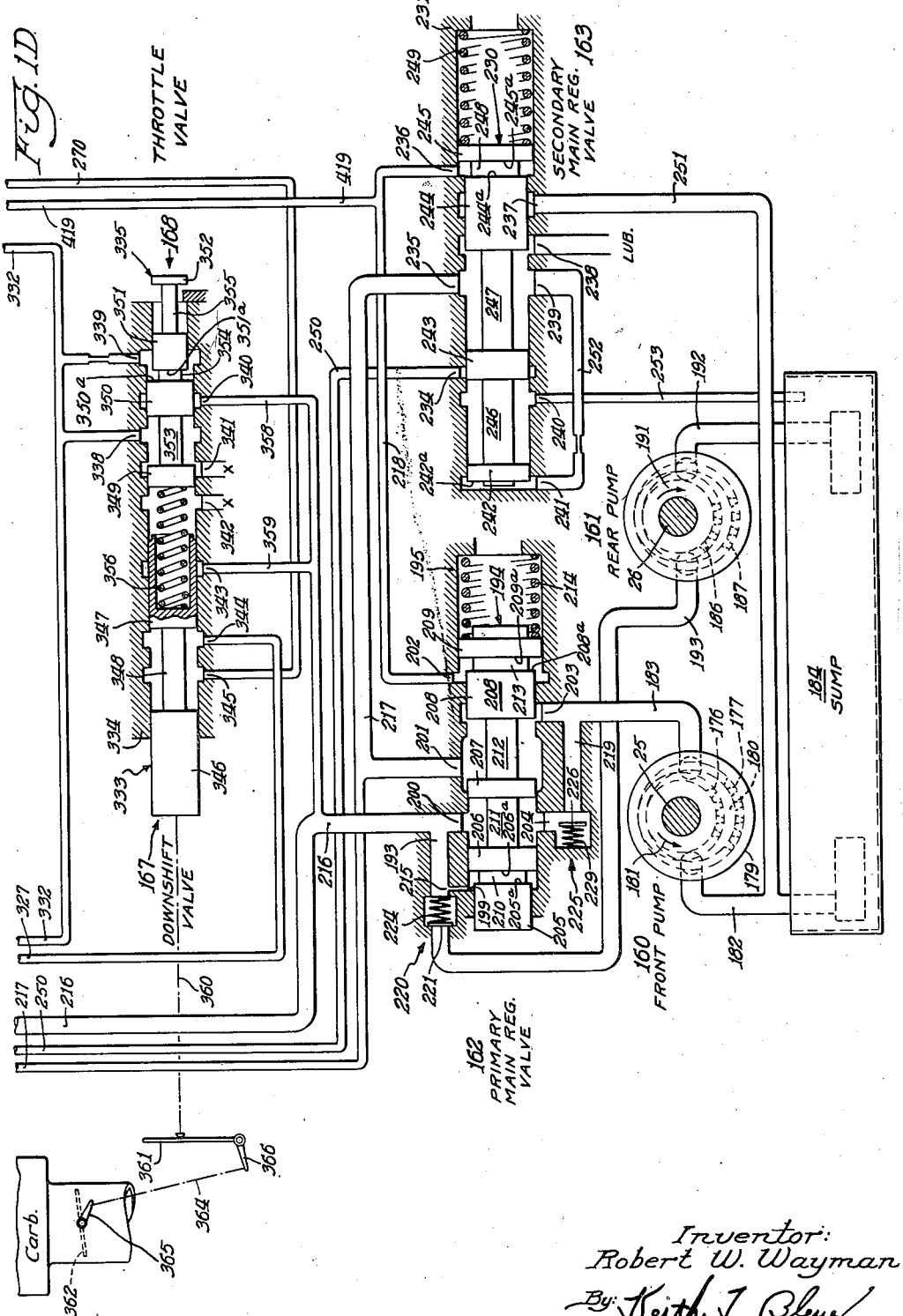

Nov. 13, 1956  R. W. WAYMAN  2,770,148
TRANSMISSION

Filed Oct. 2, 1951  6 Sheets-Sheet 5

LINE PRESSURE CHARACTERISTIC IN HIGH RANGE.

FRONT SERVO APPLY
PRESSURE VS. MILES
PER HOUR & PER CENT
THROTTLE OPENING.

Inventor:
Robert W. Wayman
By: Keith J. Blewer
Atty.

PRESSURE VARIATIONS ON PISTONS 98 AND 79 FOR CHANGE FROM SECOND SPEED TO THIRD SPEED.

LINE PRESSURE CHARACTERISTIC IN LOW RANGE.

Inventor:
Robert W. Wayman
By: Keith T. Bleuer
Atty.

United States Patent Office 2,770,148
Patented Nov. 13, 1956

2,770,148

TRANSMISSION

Robert W. Wayman, Muncie, Ind., assignor to Borg-Warner Corporation, Chicago, Ill., a corporation of Illinois Application October 2, 1951, Serial No. 249,296

14 Claims. (Cl. 74—472)

My invention relates to transmissions for automotive vehicles, and more particularly to hydraulic controls for such transmissions.

The present invention constitutes an improvement in transmission controls over the transmission controls shown in my co-pending application, Serial No. 166,136, filed June 5, 1950, for "Controls for Power Transmission." In this prior application, I disclose a transmission having first and second friction clutches and first and second friction brakes. Three forward drive power trains are obtained when the first one of the clutches is engaged, together with the first brake for a low speed forward drive, together with the second brake for an intermediate speed forward drive and together with the second clutch for a high speed forward drive, and a reverse drive is obtained when the second clutch together with the first brake are engaged. Hydraulic pressure control means is included in the transmission controls in this prior application for providing a line pressure applied to the clutches which increases with vehicle engine throttle opening and decreases with vehicle speed, and extra fluid pressure regulating means is provided for supplying a regulated pressure to the first brake which is less than line pressure for the low speed forward drive. The same line pressure that is applied to the second clutch is applied to the first brake for the reverse drive.

It is an object of the present invention to provide a modified system of hydraulic controls which applies the same decreased pressure to the first brake for both the low forward and the reverse drive power trains for the purpose of decreasing the jar to the transmission and the vehicle on the initial engagement of the first brake for the reverse drive.

The second brake in the above application is shown as being engaged by this line pressure that increases with the throttle opening and decreases with vehicle speed. It is an object of the present invention to provide an additional fluid pressure modulating means under the control of the vehicle accelerator for providing a pressure decreased with respect to line pressure, which is applied to the second brake for engaging it and which increases with engine throttle opening and decreases with vehicle speed, for the purpose of smoothing changes from intermediate speed drive to high speed drive or vice versa at closed or nearly closed engine throttle openings.

The invention consists of the novel constructions, arrangements and devices to be hereinafter described and claimed for carrying out the above stated objects and such other objects as will appear from the following description of a preferred form of the invention, illustrated with reference to the accompanying drawings, wherein:

Fig. 1 is a diagram illustrating the relative positions in which the component Figs. 1A, 1B, 1C and 1D shall be placed to form a complete view;

Figs. 1A, 1B, 1C and 1D, when placed together as illustrated in Fig. 1, are a diagrammatic illustration of a transmission and an associated hydraulic control system embodying the principles of the invention;

Like characters of reference designate like parts in the several views.

Figure 2:
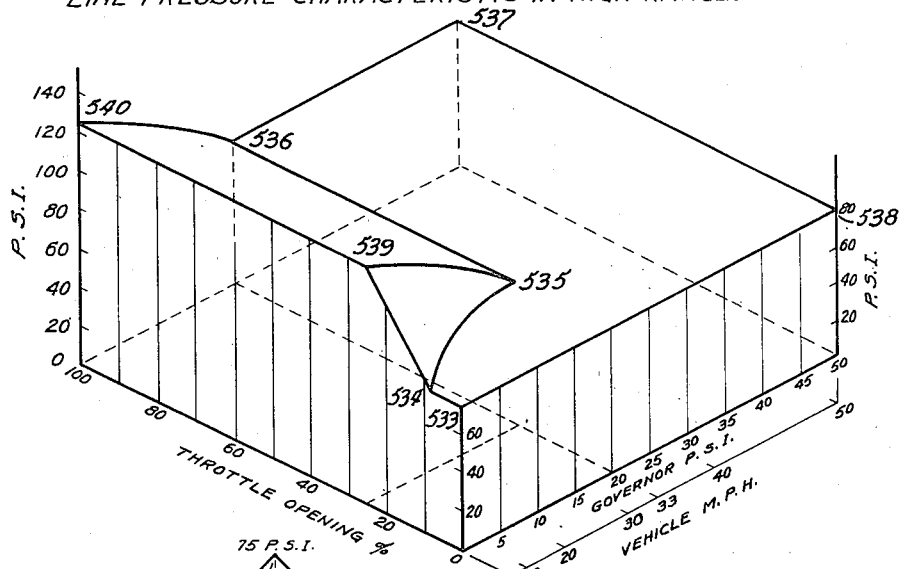
Fig. 2 is a graph showing the variations, with changes in throttle opening and vehicle speed, of line pressure applied to the clutches of the transmission for high range forward driving conditions.

Referring now in particular to Fig. 1A of the drawings, the transmission may be seen to comprise a drive shaft 25, a driven shaft 26 and intermediate shafts 27 and 28. The shaft 25 may be the usual crankshaft of the vehicle engine, and the shaft 26 may be connected by any suitable means (not shown) with the driving road wheels of the vehicle. The shafts 27 and 28 are in effect piloted with respect to the shafts 25 and 26. The transmission comprises in general, a hydraulic torque converter 30, hydraulically operated friction clutches 31 and 32, hydraulically operated friction brakes 33 and 34 and a planetary gear set 35.

The hydraulic torque converter 30 comprises a vaned impeller element 36, a vaned rotor or driven element 37 and a vaned stator or reaction element 38. The impeller 36 is driven from the drive shaft 25 and the rotor 37 is fixed to the intermediate shaft 27. The stator 38 is rotatably disposed on a stationary sleeve 42, and a one-way brake 43 is disposed between the stator and the sleeve 42. The one-way brake 43 may be of any suitable construction, and, in the illustrated embodiment, comprises a plurality of tiltable sprags 44 disposed between the sleeve 42 and an outer race 46 fixed with respect to the stator 38. The one-way brake 43 is so arranged as to allow a free rotation of the stator 38 in the forward direction, that is in the same direction in which the drive shaft 25 rotates and which is indicated by the arrow 51 and prevents a rotation of the stator in the reverse direction.

The torque converter 30 functions in a manner well known for such torque converters for driving the rotor or driven element 37 at an increased torque with respect to the torque impressed on the impeller 36 of the converter. The vanes of the stator 38 function to change the direction of flow of fluid between the rotor and impeller so as to provide this increased torque on the driven element 37. In this case the reaction on the stator 38 is in the direction reverse to the rotation of the drive shaft 25, so that the one-way brake 43 engages and prevents rotation of the stator in this direction. When the speed of the driven element or rotor 37 reaches a predetermined value, the reaction on the vanes of the stator 38 changes in direction, tending to rotate the stator in the forward direction, and the brake 43 releases and allows such rotation of the stator. In this case, the torque converter 30 functions as a simple fluid coupling to drive the rotor 37 at substantially the same speed and with no increase in torque with respect to the impeller 36.

The planetary gear set 35 comprises a sun gear 55 which is fixed on the shaft 28, a second sun gear 56 fixed on a sleeve portion 57 which is rotatable on the shaft 28, a ring gear 58 fixed with respect to the driven shaft 26, a plurality of planet gears 60, a plurality of planet gears 61 and a planet gear carrier 62. Each planet gear 60 and each of the planet gears 61 is rotatably disposed in the carrier 62. The gear carrier 62 is rotatably disposed with respect to the shaft 28 and shaft portion 57 by any suitable bearings. The planet gears 61 are each in mesh with the sun gear 55 and also with a planet gear 60. The gears 60 are also in mesh with the ring gear 58, and the gears 60 are in mesh with the sun gear 56.

The clutch 31 is arranged to connect the shaft 27 driven by the rotor 37 with the shaft 28 and the sun gear 55 formed thereon. The clutch 31 comprises clutch discs 65 splined on to a hub member 66 which is fixed on the shaft 28. The clutch also comprises clutch discs 67 interleaved between the discs 65 and fixed within a member 68 rotatably disposed on the shaft 28 and fixed to the shaft 27 so as to be driven by the latter shaft.

The clutch 31 comprises a movable pressure plate 70 splined within the member 68 and adapted to press the friction discs 65 and 67 together in frictional engagement between it and the enlarged portion 69 which acts as a pressure member on the other side of the discs. An annular piston 71 is provided for actuating the movable pressure plate 70. Pressure from the piston 71 is transmitted to the pressure plate 70 through a spring strut 73. The strut 73 at its inner periphery is acted on by the piston 71, so that its inner periphery moves axially with respect to its outer periphery and moves the pressure plate 70 which is acted on by the strut 73 at intermediate points thereof. The resilient action of the ring 73 functions to return the piston back into its illustrated position when fluid pressure, applied as will be hereinafter described, is released from the piston.

The clutch 32 is arranged to connect the part 68 and thereby the shaft 27 with the shaft portion 57 and sun gear 56 and comprises clutch discs 75 splined on to the member 68 and clutch discs 76 splined within a member 77 which is fixed to the shaft portion 57. A pressure plate portion 78 is fixed to the member 77 on one side of the clutch discs, and an annular hydraulic piston 79 is provided on the other side of the discs for compressing the discs between it and the pressure plate portion 78.

Fluid under pressure is supplied to the piston 71 by a passage 83. A passage 86 is provided for supplying fluid under pressure to the piston 79. The passages 83 and 86, which are stationary, are connected with the rotatable parts 68 and 77 by any suitable manifold means (not shown).

The brake 33 comprises a brake band 90 adapted to be contracted on the part 77 for thereby braking the sun gear 56. One end of the band 90 is fixed, and the other end is adapted to have force applied to it for tightening the band on the part 77 by means of a strut 93 disposed between this end of the band and one end of a lever 94. The lever 94 is acted on at its opposite end by a piston 98. A spring 99 is provided for yieldably holding the piston 98 in its brake disengaging position. Fluid pressure chambers 101 and 102 are provided on opposite sides of the piston 98 within a servo-motor 103 containing the piston 98.

The brake 34 comprises a brake band 104 adapted to be contracted on a drum portion 105 of the planetary gear carrier 62. The band 104 has one of its ends fixed, and the band 104 at its other end is acted on by a strut 110 which is disposed between this end of the band and a lever 111 which is acted on by a piston 113. A spring 115 is provided for yieldably holding the piston 113 in its brake disengaging position.

In operation, the transmission has a neutral condition and provides low, intermediate and high speed ratios in forward drive and a drive in reverse. The transmission is in neutral condition when the clutches 31 and 32 and the brakes 33 and 34 are disengaged. For ordinary driving conditions of the vehicle, the transmission is operated in its high range which includes the intermediate and high speed ratios.

The intermediate speed ratio power train is completed by engaging the clutch 31 and the brake 33. The clutch 31 is engaged by applying fluid pressure to the piston 71 through the conduit 83. Engagement of the brake 33 may be obtained by applying fluid pressure to the piston surface 98b to move the piston 98 to the right as seen in Fig. 1A and rotate the lever 94 counterclockwise and thereby tighten the band 90 on the part 77. The intermediate speed power train exists from the drive shaft 25 through the torque converter 30 to the intermediate shaft 27 and thence through the clutch 31 to the shaft 28 and through the planetary gear set 35 to the driven shaft 26. The brake 33 is effective to hold the part 77 stationary and to brake the sun gear 56 of the planetary gear set, so that the sun gear 56 constitutes the reaction element of the gear set. The shaft 28 is driven as just described, and the sun gear 55 of the gear set 35 thus constitutes the driving element of the gear set. The drive is transmitted through the planet gears 61 and 60 to the ring gear 58 driving the driven shaft 26. Since there are sets of two planet gears 61 and 60 between the sun gear 55 and the ring gear 58, and the sun gear 56 in mesh with the gears 60 functions as the reaction element of the gear set, the ring gear 58 and thereby the shaft 26 are driven at a reduced speed, intermediate speed ratio, with respect to the shaft 27. At this point it may be noted that the direction of reaction on the sun gear 56 and the part 77 is in the reverse direction as indicated by the arrow A in Fig. 1. This direction is opposite the direction of rotation of the drive shaft 25 indicated by the arrow 51, and the part 77 in tending to rotate in this direction augments the action of the strut 93 in engaging the band 90 and causes increased band engagement, since the part 77 tends to carry the end of the band acted on by the strut along with the part 77 in the same direction in which this end of the band is urged by the strut. It is apparent that the band 90 wraps or is partially self-energizing for this rotative tendency of the part 77.

The high speed ratio power train through the transmission, which constitutes a substantially direct drive between the shafts 25 and 26, may be obtained by engaging the clutch 32, allowing the clutch 31 to remain engaged. The brake 33 is disengaged at this time. The clutch 32 may be engaged by applying fluid pressure through the passage 86 to the piston 79. In this drive, the shaft 27 is driven through the torque converter 30 from the drive shaft 25 as in intermediate speed drive. The shaft 27 is connected through the clutch 31 to drive the sun gear 55 as was the case in intermediate speed drive. The clutch 32 functions to connect the part 68, which in turn is connected with the shaft 27, with the part 77 and thereby with the sun gear 56 splined thereto. Thus both the sun gear 55 and also the sun gear 56 are driven by the shaft 27, and as is well known in connection with planetary gear sets, when two elements of the gear set are driven at the same speed, the gear set becomes locked up so that all of its gears and elements rotate as a unit, and there is thus a direct drive between the shaft 27 and driven shaft 26. A substantially direct drive generally exists in this power train between the shafts 25 and 26, since the converter 30 may be expected to function as a simple fluid coupling generally in this drive.

The low speed forward drive may be obtained by engaging the clutch 31 and the brake 34. The clutch 31 is engaged as has been previously described, and the brake 34 may be engaged by applying fluid pressure on the piston 113 causing a movement of the piston 113 against the action of the spring 115 and a rotation of the lever 111 in the clockwise direction as seen in Fig. 1A so as to pull the band 104 about the drum portion 105. Engagement of the brake 34 causes the planet gear carrier 62 to function as the reaction element of the gear set, and the sun gear 55 is driven from the shafts 25 and 27 substantially as in intermediate speed drive. Since there are sets of the two planet gears 61 and 60 between the sun gear 55 and ring gear 58, the ring gear 58 is driven at a reduced speed drive with respect to the sun gear 55 and shaft 28, and the speed of the ring gear 58 and shaft 26 connected therewith is lower than their speed relative to the shaft 28 for intermediate speed drive. For most vehicle driving conditions when low speed drive is used, the rotor 37 is driven at increased torque, and the gear set 35 connected in tandem with the converter 30 also increased the torque to provide a relatively great overall torque ratio between the shafts 25 and 26. It may be noted that the reaction on the planet gear carrier 62 and on the drum 105 for low speed forward drive is in the reverse direction indicated by the arrow B in Fig. 1A which is opposite to the direction of rotation of the drive shaft 25, and this reaction or tendency to rotate tends to move the band to unwrap and disengage the band from the drum 105. For this direction of reaction, the brake 34 is thus self-deenergizing and provides a less braking effect than for a case in which this reaction did not exist.

Reverse drive may be obtained through the transmission by engaging the brake 34 and engaging the clutch 32. For this drive, the power train exists from the drive shaft 25 through the torque converter 30 to the intermediate shaft 27 and from thence through the clutch 32 to the sun gear 56 and through the planetary gear set 35 to the driven shaft 26. The brake 34 causes the planet gear carrier to function as the reaction element of the gear set, and since there are only the single planet gears 60 between the sun gear 56 and the ring gear 58, the ring gear 58 will be driven at a reduced speed in the reverse direction with respect to the sun gear 56 and the shaft 27 in accordance with well known principles of operation of planetary gear sets. For this drive, the torque converter 30 generally functions to increase torque, and thus the torque impressed on the driven shaft 26 is the product of the torque increases by the torque converter 30 and the planetary gear set 35. The reaction on the brake drum 105 for reverse drive is in the forward direction as indicated by the arrow C in Fig. 1A, that is, in the same direction as the drive shaft 25 rotates. This tendency of the drum 105 to rotate in this direction assists the strut 110 in forcing the band end 109 to move in the direction indicated by the arrow C, and the brake 34 thus wraps or is self-energizing for this direction of reaction so that the braking effect is greater than would be the case if there were no tendency for the drum to rotate. The reaction on the drum 105 is greater for reverse drive than for low forward drive, and hence the brake 34 has been constructed to wrap for the reaction for reverse drive instead of that for low speed forward drive.

The hydraulic control system for the transmission comprises in general a front pump 160 and a rear pump 161 which, together provide a source of hydraulic pressure; a primary main regulator valve 162 for regulating the fluid pressure from the pumps and applied to the pistons for the various friction brakes and clutches of the transmission; a secondary main regulator valve 163 for regulating the fluid pressure from the pumps applied to the torque converter 30; a manually operated selector valve 164 for conditioning the transmission for operation in different forward speed ratios and in reverse and having an "H" or High Range position, an "L" or Low Range position, an "N" or Neutral position, and an "R" or Reverse position; a governor valve 165; an automatic 2nd to 3rd ratio shift valve 166 hereinafter designated as a 2-3 valve for changing the drive through the transmission from its second forward speed ratio to its third forward speed ratio; a downshift valve 167 for causing actuation of the 2-3 valve under manual control for changing the drive through the transmission from its third to its second speed ratio when the operator of the vehicle so desires; a throttle valve 168 for providing a throttle pressure that increases with the depression of the vehicle accelerator; a throttle modulator valve 169 hereinafter designated as a TV modulator valve for supplying the throttle pressure from the valve 168 to various lands of a compensator valve 170 for different conditions of operation of the transmission, the compensator valve 170 providing a fluid pressure that varies inversely with the depression of the vehicle accelerator to the regulator valves 162 and 163 so that they regulate correctly; a low regulator valve 171 which functions on a shift of the manual valve 164 from high range to low range position with a closed vehicle engine throttle to regulate the hydraulic pressure to apply the rear brake 34 with less than the pressure that is supplied by the primary main regulator valve 162 for thereby providing a smooth change in speed ratio under these circumstances; a 1st to 2nd ratio shift valve 172 hereinafter designated as a 1-2 valve which functions on a change between ranges to cause simultaneous engaging and disengaging fluid pressure flows to the motors for the front brake 33 and rear brake 34 when the proper pressure values are reached; a 3rd to 2nd ratio shift control valve 173 hereinafter designated as a 3-2 control valve which functions to provide a restriction in a fluid discharge conduit for the piston for the front brake 33 on a governor controlled change from third speed to second speed ratio; a low inhibitor valve 174 which functions under the influence of the governor valve 165 above a certain speed of the vehicle to provide a speed ratio change from third speed ratio to second speed ratio rather than to first speed ratio when the manual valve 164 is moved from its high range position to its low range position; and a front servo apply regulator valve 175 which regulates the apply pressure for the brake 33 under closed or nearly closed throttle conditions for providing smooth second to third or third to second speed ratio changes. These various hydraulic elements and mechanisms, including their construction and operation, will now be described in greater detail.

The pump 160 may be of any suitable construction, and in the illustrated embodiment of the controls comprises an inner gear 176 in mesh with an eccentrically disposed outer gear 177. The inner gear 176 is connected to be driven by the shaft 25 through the impeller 36 of the converter 30. The gears 176 and 177 are disposed in a pump casing 179, and the casing 179 comprises a crescent shaped portion 180 disposed between the gears 176 and 177, as shown. The inner gear 176 is driven in the direction indicated by the arrow 181 so that the gear 177 rotates in this direction also, and the pump 160 is thus effective to pump from an inlet conduit 182 to a discharge conduit 183. The conduit 182 is arranged to draw fluid out of a transmission sump 184.

The rear pump 161 is similar in construction to the front pump 160 and comprises an inner gear 186 in mesh with an eccentrically disposed ring gear 187. The gear 186 is fixed on the driven shaft 26 of the transmission by any suitable means. The gear 186 is driven in a clockwise direction, as indicated by the arrow 191 when the driven shaft 26 rotates in the same direction as the drive shaft 25 for providing a forward drive of the vehicle, and in this case, the pump is adapted to draw fluid through an inlet conduit 192 and discharge it into an outlet conduit 193. The inlet conduit 192, like the conduit 182, is arranged to draw fluid from the transmission sump 184.

The primary main regulator valve 162 comprises a piston 194 slidably disposed in a casing portion 195. The casing portion 195 has ports 199, 200, 201, 202, 203 and 204 as shown. The piston 194 comprises lands 205, 206, 207, 208 and 209, and grooves 210, 211, 212 and 213 between the lands. A spring 214 is disposed between the land 209 and the adjacent end of the casing portion 195, as shown.

The port 199 is connected by means of a small passage 215 with the conduit 193. The port 200 is connected with a conduit 216 that serves as a source of regulated fluid pressure to be applied to the pistons for the brakes and clutches, as will hereinafter be described, and the conduit 193 is connected with the conduit 216 as shown. The port 201 is connected with a conduit 217, and the port 202 is connected with a conduit 218. The port 203 is connected with the conduit 183, and the port 204 is also connected with this latter conduit by means of a conduit 219.

A one-way check valve 220 is disposed in the conduit 193 and in its illustrated form comprises a valve element 221 acted on by a spring 224. A similar one-way check valve 225 is provided in the conduit 219 and comprises a valve element 226 acted on by a spring 229.

The secondary main regulator valve 163 comprises a piston 230 slidably disposed in a casing portion 231. The casing portion 231 is provided with ports 234, 235, 236, 237, 238, 239, 240 and 241. The piston 230 is provided with lands 242, 243, 244 and 245 and grooves 246, 247 and 248 between the lands. A spring 249 is provided between the land 245 and the adjacent end of the casing portion.

The port 234 is connected with a conduit 250; the port 235 is connected with the conduit 217; the port 236 is connected with the conduit 218; the port 237 is connected with a conduit 251; the port 238 is a bleed port adapted either directly or indirectly to discharge into the sump 184; the ports 239 and 241 are connected together by means of a conduit 252; and the port 240 is connected to a conduit 253.

The conduits 217 and 250 are both connected with the torque converter 30 as shown. The conduit 217 constitutes a fluid supply conduit for the converter and the conduit 250 constitutes an exhaust conduit for the converter. The conduit 251 is connected with the intake conduit 182 for the pump 160, as shown, and constitutes an exhaust conduit for the valve 163. The conduit 252 connecting the ports 239 and 241 is for the purpose of providing a regulating action for the valve 163, as will be described. The conduit 253 is at times connected by means of the valve 163 with the conduit 250 and discharges into the sump 184.

The manual selector valve 164 comprises a piston 255 disposed in a casing portion 256. The casing portion 256 has a plurality of ports 258, 259, 260, 261, 262 and 263 in communication therewith. The piston 255 has lands 264, 265 and 266 and grooves 267 and 268 separating the lands.

The port 263 is connected with a conduit 269; the port 262 is connected with the conduit 83 which, as has been previously described, is connected to apply fluid pressure to the piston 71 for engaging the front clutch 31; the port 261 is connected with the fluid supply conduit 216; the port 260 is connected with a conduit 270; the port 259 is connected with a conduit 270; the port 259 is connected with a conduit 271; and the port 258 constitutes a bleed port through which fluid may freely discharge into the sump 184.

The selector valve piston 255 is adapted to be manually controlled by any suitable means and has the following positions: "R" or reverse, "N" or neutral, "H" or high range, and "L" or low range.

The governor valve 165 constitutes a hydraulic governor and comprises a piston 275 movably disposed in a casing 276 which is fixed on the driven shaft 26. The casing 276 is provided with ports 280, 281, 282 and 283. The piston 275 is provided with lands 284, 285 and 286 and grooves 287 and 288 separating the lands as shown. The port 280 is connected with a conduit 289 which in turn is connected with the conduit 83; the ports 281 and 282 are connected with a conduit 290 and the port 283 is connected with a passage 291 through which fluid may freely discharge into the sump 184.

The 2–3 valve 166 comprises pistons 292, 293 and 294 slidably disposed in a casing portion 295. The casing portion 295 is provided with ports 302, 303, 304, 305, 306, 307, 308, 309, 310, 311 and 312. The piston 292 comprises a land 313; the piston 293 comprises lands 316, 317 and 318 and grooves 319 and 320 between the lands and the piston 294 comprises lands 322 and 323 and a groove 324 separating the lands. A spring 325 is provided between the land 316 and an inner face of the casing portion 295, and a spring 326 is provided between the land 316 and the land 313 on the piston 292.

The port 302 is connected with a conduit 327; the port 303 is connected with the conduit 269 which is provided with a fluid restriction 328 therein; the port 304 is connected with the conduit 86; the port 305 is connected with the conduit 271; the port 306 is a bleed port through which fluid may freely discharge into the sump 184; the port 307 is connected with the conduit 290 by means of a branch conduit 329; the port 308 is connected with a conduit 330; the port 309 is connected with the conduit 290 through the branch conduit 329; the port 310 is connected with the conduit 330 through a passage 331; the port 311 is connected with the conduit 330; and the port 312 is connected with a conduit 332.

The downshift valve 167 comprises a piston 333 disposed in a casing portion 334, and the throttle valve 168 comprises a piston 335 also disposed in the casing portion 334. The casing portion 334 is provided with ports 338, 339, 340, 341, 342, 343, 344 and 345. The downshift valve piston 333 is provided with lands 346 and 347 and with a groove 348 separating the lands. The piston 335 is provided with lands 349, 350, 351 and 352 and grooves 353, 354 and 355 separating the lands. A spring 356 is disposed between the pistons 333 and 335, as shown.

The port 338 is connected with the conduit 332 for providing a regulated throttle pressure to the conduit 332 as will be hereinafter described; the port 339 is connected with the conduit 332; the port 340 is connected with a conduit 358 which in turn is connected with the fluid supply conduit 216; the ports 341 and 342 are fluid bleed ports adapted to freely discharge into the sump 184; the port 343 is connected by means of a branch conduit 359 with the conduit 358 and through the latter with the fluid supply conduit 216; the port 344 is connected with the conduit 327; and the port 345 is connected with the conduit 270.

The downshift valve piston 333 is connected by any suitable linkage such as the link 360 with the vehicle accelerator 361. The accelerator 361 has an ordinary connection with the carburetor butterfly valve 362 for the internal combustion vehicle driving engine 363 which may include a link 364 connecting the carburetor throttle lever 365 and a lever 366 fixed to move with the accelerator 361.

The TV modulator valve 169 comprises pistons 367 and 368 disposed in a casing portion 369. The casing portion is provided with ports 372, 373, 374, 375, 376, 377, 378 and 379. The piston 368 is provided with lands 380, 381 and 382 and grooves 383 and 384 between the hands. A spring 385 is disposed between the right end of the piston 368 and an adjacent inner face of the casing portion 369.

The port 372 is connected with a conduit 386; the port 373 is a bleed port from which fluid may freely discharge into the sump 184; the port 374 is connected to a conduit 387; the port 375 is connected with the conduit 332; the port 376 is connected with a conduit 388; the port 377 is a bleed port similar to the port 373 through which fluid may freely discharge into the sump 184; the port 378 is connected by a passage 389 with the conduit 387; and the port 379 is connected with a conduit 391.

The compensator valve 170 comprises pistons 392 and 393 in a casing portion 394. The casing portion is provided with ports 399, 400, 401, 402, 403, 404, 405 and 406. The piston 392 is provided with lands 407, 408, 409, 410, 411 and grooves 412, 413, 414 and 415 between the lands. A spring 417 is disposed between the land 411 and an adjacent inner face of the casing portion 394.

The port 399 is connected with the conduit 387; the port 400 is connected with the conduit 388; the port 401 is connected with the conduit 290; the port 402 is a bleed port adapted to discharge fluid into the sump 184; the port 403 is connected to the fluid supply conduit 216 by means of a branch conduit 418; the port 404 is connected with a conduit 419 by means of a branch conduit 420, and, as shown, the conduit 419 in turn is connected with the conduit 218; the port 405 is a bleed port for discharging fluid into the sump 184; and the port 406 is connected with the conduit 419 by means of a branch conduit 421.

The low regulator valve 171 comprises pistons 423 and 424 disposed in a casing portion 425. The casing portion has ports 429, 430, 431, 432, 433, 434 and 435. The piston 423 comprises a land 436, and the piston 424 comprises lands 439, 440 and 441 and grooves 442 and 443.

The port 429 is connected with a conduit 445; the ports 430 and 431 are bleed ports adapted to freely discharge fluid into the sump 184; the port 432 is connected with the conduit 445; the port 433 is connected with a conduit 449; the port 434 is connected with a conduit 450 which in turn is connected to apply fluid pressure to the piston 113 for the brake 34; and the port 435 is connected to the conduit 332 by means of a branch conduit 451.

The 1-2 valve 172 comprises a piston 452 disposed in a casing portion 453. The casing portion 453 has ports 456, 457, 458, 459 and 460. The piston 452 has lands 461, 462 and 463 and grooves 464 and 465 between the lands.

The port 456 is connected with a conduit 467; the ports 457 and 458 are bleed ports adapted to discharge fluid into the sump 184; the port 459 is connected to the conduit 449; and the port 460 is connected to a conduit 468 which in turn is connected with the conduit 83.

The 3-2 control valve 173 comprises a piston 469 slidably disposed is a casing portion 470. The casing portion 470 is provided with ports 472, 473, 474 and 475, as shown. The piston 469 is provided with lands 476 and 477 spaced by a groove 478. A spring 479 extends between the piston 469 and an adjacent inner face of the casing portion 470.

The port 472 is a bleed port adapted to discharge fluid freely into the sump 184; the port 473 is connected with a conduit 481 which is connected with the piston face 98a of the brake operating piston 98; the port 474 is connected with a conduit 482 which in turn is connected with the conduit 86; and the port 475 is connected with the conduit 332 by means of a branch conduit 483. A restriction 484 is provided in the conduit 482, and a passage 485 of relatively small diameter is provided between the conduits 481 and 482, as shown.

The low inhibitor valve 174 comprises a piston 486 disposed in a casing portion 487. The casing portion 487 has ports 490, 491, 492, 493, 494 and 495. The piston 486 is formed with lands 496 and 497 and a groove 498 therebetween. A spring 500 is disposed between the land 496 and an adjacent inner surface of the casing portion 487, as shown.

The port 490 is connected by means of a conduit 501 with the conduit 449 and the conduit 386; the port 491 is connected with the conduit 270 by means of a branch conduit 502; the port 492 is connected by means of a branch conduit 503 with the conduit 290; the port 493 is connected to a conduit 504; the port 494 constitutes a bleed port through which fluid may freely discharge into the sump 184; and the port 495 is connected to the conduit 504. A restriction 505 is provided in the conduit 501 for purposes to be described.

The front servo apply regulator valve 175 comprises pistons 506 and 507 disposed in a casing portion 508, and the casing portion is provided with cylindrical cavities 509 and 510 of respectively smaller and larger diameters for receiving the piston 506 and is provided with a cavity 511 intermediate in size between the cavities 509 and 510 for receiving the piston 507. The casing portion 508 is provided with ports 512, 513, 514, 515, 516 and 517, the ports 512, 516 and 517 extending into the cavity 509, the port 515 extending into the cavity 510, and the port 514 extending into the cavity 511. The piston 506 is provided with lands 518, 519 and 520 which are spaced by grooves 521 and 522, the lands 518 and 519 being slidably disposed in the cavity 509, and the land 520 being slidably disposed in the cavity 510.

The ports 512 and 513 are bleed ports adapted to freely discharge fluid into the sump 184; the port 514 is connected with a conduit 523 having a restriction 524 therein; the port 515 is connected with a conduit 525 which in turn is connected with the conduit 332; the port 516 is connected with a conduit 526 which is in turn connected with the piston 98 for the brake 33 for applying fluid pressure on to the face 98b of the piston, and the conduit 523 is connected with the conduit 526, as shown; and the port 517 is connected with the conduit 467.

In operation, the transmission and its hydraulic control system are under the control of the vehicle operator by means of the accelerator 361 of the vehicle and the manual selector valve 164. The transmission is conditioned for various types of operation by moving the manual selector valve piston 255 into the positions corresponding to the type of operation desired.

The transmission is maintained in its neutral condition by having the manual selector valve piston 255 in its "N" or neutral position. When the engine 363 begins operating, the pump 160 driven by the engine supplies line pressure to the conduit 183 and connected conduits, pumping oil from the sump 184 through the conduit 182. The conduit 219 is connected with the conduit 183 and has line pressure therein, and the conduit 216 is connected with the conduit 219 through the check valve 225, the ports 204 and 200, and the groove 211 of the piston 194. The check valve 225 is held open by the fluid pressure from the pump 160, and the check valve 220 is held closed by means of the line pressure which is effective on the check valve through the conduit 193 connected with the conduit 216. The land 265 of the manual valve piston 255 in the neutral position of the piston blocks the port 261 and conduit 216, as shown, and thereby prevents application of fluid pressure to the pistons for applying any of the clutches and brakes of the transmission.

The primary main regulator valve 162 functions for all conditions of the transmission and its hydraulic control system to regulate the line pressure in the conduit 216 and connected conduits to predetermined maximum values. For this purpose the line pressure is supplied through the conduit 193 and through the passage 215 to the faces 205a and 206a of the lands 205 and 206. The face 206a is of greater area than the face 205a, and the line pressure applied to these land faces tends to move the primary main regulator valve piston 194 to the right against the action of the spring 214. This movement of the piston 194 tends to release the line pressure from the conduit 183 between an edge of the port 203 and an end of the land 208 into the groove 212 and into the converter supply conduit 217 through the port 201. The spring 214 is of such strength that the port 203 will not be thus opened by line pressure influence on the valve piston 194 until a certain line pressure is reached. This line pressure is maintained by the valve 162 in thus relieving pressure from the conduit 183, assuming that there are no other influences on the piston 194 than just mentioned.

For most conditions of operation, however, an additional variable force is applied to the piston 194 tending to move it, and this third force is due to fluid pressures of different values supplied to the faces 208a and 209a of the lands 208 and 209 through the port 202 and conduits 218, 419 and 420. For the neutral condition of the transmission with the accelerator 361 in its closed throttle position, full line pressure is applied to the land faces 208a and 209a, and the conduits 218 and 419 are connected by the valve piston 392 of the compensator valve 170 with the conduits 418 and 216 for this purpose. The line pressure in the conduit 418 flows through the port 403, the groove 415 of the piston 392 and the port 404 to the conduits 420, 419 and 218. This line pressure is applied to a face 407a of the land 407 of the piston 392 through the conduit 421 connected with the conduit 419; however, for this condition of operation the spring 417 acting on the piston 392 is of sufficient strength to hold the piston 392 to the limit of its movement toward the left and the fluid applied to this land face has no effect.

The fluid pressure applied to the faces 208a and 209a of the lands 208 and 209 of the main regulator valve piston 194 provides a force on the piston acting against the spring 214 tending to move the valve piston to the right as seen in the figure to more fully open the port 203, due to the different sizes of the lands 208 and 209. The full line pressure applied to the faces 208a and 209a thus maintains the line pressure at a predetermined minimum, which for one certain embodiment of the invention is 75 lbs. per sq. in.

The secondary main regulator valve 163 is for the purpose of regulating the fluid pressure within the conduit 217 and thereby within the torque converter 30 to which the conduit 217 supplies fluid pressure. The pressure in the conduit 217 is applied to the face 242a of the land 242 on the secondary main regulator valve piston 230 through the port 235, the groove 247, the port 239, the conduit 252 and the port 241, and as the fluid pressure in the conduit 217 and thereby in the converter 30 increases, it tends to move the piston 230 to the right against the action of the spring 249 to open up the bleed port 238 and meter fluid between the land 244 and an edge of the port 238. Thus, as the fluid pressure in the conduit 217 and in the converter 30 tends to increase, the excessive fluid pressure is discharged through the port 238, and the pressure in the conduit 217 and converter 30 is regulated to a predetermined maximum.

The pressure within the conduits 419 and 218 is also applied to the valve piston 230 for changing the regulated converter pressures in conduit 217 for various conditions of operation of the transmission and controls. The fluid pressure in the conduit 218 is applied to the land faces 244a and 245a of the valve piston 230 through the port 236. The face 245a is of greater area than the face 244a, and this fluid pressure thus tends to move the valve piston 230 to the right against the action of the spring 249 and augment the action of the converter pressure applied to the face 242a of the land 242 to open the bleed port 238 and to thus further relieve the pressure in the conduit 217 and converter 30. With full line pressure in the conduit 218 for conditions of operation just mentioned, the regulated converter pressure in the conduit 217 is thus at a minimum, which, for one particular embodiment of the invention, is substantially 30 lbs. per sq. in. The conduit 250 also connected with the converter 30 may be connected with the conduit 253 leading to the sump 184 for further relieving pressure in the converter 30, under certain conditions, as, for example, when the oil in the sump 184 is cold, in which case the resultant increased pressure in the conduit 252 applied to the land face 242a will move the valve piston 230 still farther to the right against the action of the spring 249 so as to connect the port 234 with the port 240 through the groove 246 of the piston 230.

The transmission and its control system are conditioned for operation in high range by moving the manual selector valve piston 255 into its "H" or high range position in which position the piston 255 causes a connection through the groove 267 of the ports 263 and 262 with the fluid pressure supply port 261. Line pressure is supplied through the groove 267 of the manual selector valve piston 255 to the port 262 and thence to the conduit 83 which is connected with the clutch piston 71. Line pressure is thus applied to the clutch piston 71 and engages the clutch 31 with a minimum engaging pressure corresponding to the minimum line pressure that exists assuming that the accelerator 361 is in closed throttle position.

The conduit 468 is connected with the conduit 83 as shown, and line pressure is applied to a land face 461a of the 1–2 valve piston 452 and moves the piston to the limit of its movement to the right. The valve piston 452 in this position connects the ports 460 and 456 and connects the conduit 467 with the conduit 468 to supply line pressure to the conduit 467. The front servo apply regulator valve 175 connects the conduit 467 with the conduit 526 that is in turn connected with the apply side 98b of the piston 98 for the brake 33. The regulator valve 175 functions to further regulate and decrease the fluid pressure as supplied to the conduit 526. The pressure in conduit 467 is applied to the land face 518a of the valve piston 506 in the regulator valve 175 and moves the pistons 506 and 507 to the right so that the ports 516 and 517 are connected by means of the cavity 509. Fluid pressure from the conduit 467 is thus supplied through the ports 516 and 517 to the conduit 526 and through the latter conduit on the piston face 98b for applying the brake 33. The pressure in the conduit 526 is applied on the right end of the valve piston 507 through the conduit 523, and this application of pressure tends to move the pistons 507 and 506 to the left so that the land 518 blocks the port 516, this movement of the pistons 507 and 506 being against the line pressure impressed on the left end of the valve 506. Since the piston 507 is larger in diameter than the land 518 of the piston 506, the pistons 506 and 507 are moved to the left to close the port 516 when the fluid pressure in the conduit 526 is at some value less than the line pressure existing in the conduit 467, and the valve 175 has a regulating action to maintain this value of reduced pressure in the conduit 526, opening the port 516 when the pressure in the conduit is less than this value and closing the port 516 when the pressure tends to exceed this value. A pressure that varies with the opening of the vehicle throttle is also impressed on the valve piston 506 for varying the action of the valve 175 and the action of the valve 175 is also influenced by variations in line pressure produced by changes in vehicle speed and throttle opening as will be hereinafter described, and the function of the servo apply regulator valve 175 for causing smooth changes in drive from second to third speed ratio and from third to second speed ratio at substantially closed throttle conditions will also be described.

The conduit 391 is connected with conduit 467, as has been described, and the line pressure in conduit 467 is applied through the conduit 391 to the piston 367 of the TV modulator valve 169. The fluid pressure functions to move the piston against the rim 370a and moves the piston 368 along with the piston 367, all against the action of the spring 385. The TV modulator valve is thus put into condition for modulating or limiting throttle pressure, as will hereinafter be described.

Thus when the selector valve piston 255 is moved into its "H" or high range position from its neutral position, the front clutch 31 and front brake 33 are both engaged, and the intermediate speed power train is completed through the transmission. The accelerator 361 is assumed to be in its closed throttle position, and the engine 363 is rotating at idling speed, and actually there is not sufficient power transmitted through the power train and in particular through the hydraulic torque converter 30 for driving the driven shaft 26 and the vehicle; however, the drive may be made effective for driving the vehicle by simply depressing the accelerator to open the throttle valve 362 of the engine 363, thereby increasing the speed and power output of the engine.

Throttle opening movement of the accelerator also has other effects on the hydraulic control system including an increasing of the line pressure in conduit 216 and connected conduits for increasing the applying pressures for the front brake 33 and front clutch 31 and an increasing of the fluid pressure within the converter 30.

The accelerator 361 acts on the throttle valve 168 through the intermediary of the downshift valve 167 to provide a throttle pressure in conduit 332 which is less than line pressure (as in conduit 216), which throttle pressure increases from zero at closed throttle position of the accelerator to line pressure at open throttle accelerator position. The throttle valve 168, like the valves 162 and 163, is a regulator valve, providing a variable fluid pressure by metering fluid flow between a valve land and a valve port in accordance with variable forces impressed on the valve. The accelerator 361 tends to move the piston 335 of the throttle valve 168 to the right as seen in Fig. 1D upon depression of the accelerator by means of the link 360, the downshift valve piston 333 and the spring 356. Such movement of the throttle valve piston 335 provides a connection between the ports 340 and 338 through the groove 353 of the piston 335 admitting fluid under pressure into the conduit 332 through the port 338. This fluid in the conduit 332 is effective on the faces 350a and 351a of the lands 350 and 351 through the port 339. Since the land 350 is of larger diameter than the land 351, the fluid pressure on these land surfaces tends to move the valve piston 335 back to the left against the action of the spring 356, so that the land 350 tends to again close the port 340 and block further admittance of fluid pressure to the conduit 332. The greater the depression of the accelerator, the greater will be the force from the spring 356 on the throttle valve piston 335 and the greater must be the pressure in the conduit 332 for closing the port 340 by the land 350, and hence the valve 168 has a regulating action to provide a throttle pressure in the conduit 332 which increases with accelerator depression.

The throttle pressure from the throttle valve 168 is supplied through the conduit 332 to the TV modulator valve 169. The valve 169 functions to provide a limited or so called modulated TV pressure in the conduit 387 when the piston 368 of this valve is in its limiting or modulating position with line pressure acting on piston 367 functioning to hold the piston 368 in this position. This limited pressure in conduit 387 is the same as the throttle pressure in conduit 332 up to a predetermined maximum value and for further increases in throttle pressure corresponding to increased openings of the engine throttle, the modulated TV pressure in conduit 387 remains at this predetermined value. The throttle pressure in conduit 332 flows through the port 375 of the TV modulator valve 169 and through the groove 384 and port 374 to the conduit 387. The pressure in conduit 387 is applied on the face 380a of the land 380 of the TV modulator valve piston 368 through the passage 389, and the effect of this application of pressure on the valve is to tend to move the piston 368 to the right against the action of the spring 385 so as to close the port 375 by means of the land 381. The modulated TV pressure in the conduits 387 and 389 and applied to the land face 380a, however, is not sufficient to move the valve piston 368 in this manner until the modulated TV pressure has reached this predetermined maximum value, after which the valve land 381 meters the flow of fluid through the port 375 and prevents a further increase in modulated TV pressure in conduit 387. In the particular embodiment of the invention mentioned before, the modulated TV pressure had a maximum of 22 lbs. per sq. in. at about 25% throttle opening, and the modulated TV pressure remained constant for additional movements of the accelerator.

The modulated TV pressure in conduit 387 is applied to the compensator valve 170 for providing a compensator pressure in the conduit 419 that decreases with depression of accelerator pedal for initial throttle opening movements of the accelerator. The compensator pressure in conduit 419 also increases with the speed of the driven shaft 26 and of the vehicle due to action of the governor pressure in conduit 290, that increases with the speed of the shaft 26 and the vehicle, on the compensator valve 170. In this connection, the action of the governor valve 165 in producing such a governor pressure in conduit 290 will now be described.

The governor valve 165 is a regulator valve similar in many respects to the valves 162, 163 and 168 which are also regulator valves. The casing 276 for the governor valve piston 275 rotates with the driven shaft 26 of the transmission, and the piston 275 tends to move outwardly under the influence of centrifugal force. Line pressure is present in conduit 289 and feeds through port 280, the groove 288 of the piston 275, and the port 281 into the conduit 290 to supply pressure to the latter conduit. The pressure in the conduit 290 is applied to the faces 285a and 286a of the lands 285 and 286 and tends to move the piston 275 inwardly of the valve casing 276, since the face 286a is of larger area than the face 285a, so that the land 285 will move over the port 280 and block any further admission of fluid pressure to the conduit 290. A balance is attained between the centrifugal force effective on the valve piston 275 tending to move the piston outwardly of the casing 276, which increases with vehicle speed, and the force derived from the fluid pressure in the conduit 290 effective on the land faces 285a and 286a tending to move the piston 275 inwardly, which increases with the pressure in conduit 290, for every speed of the driven shaft 26 so that the valve piston 275 meters the flow of fluid under pressure to the governor output conduit 290 between the land 285 and an edge of the port 280 and provides a regulated governor pressure in the conduit 290 that increases with the speed of the driven shaft 26 and of the vehicle.

The governor pressure in conduit 290, which increases with the speed of the driven shaft 26 and of the vehicles, is impressed through the port 401 on the piston 393 of the compensator valve 170 and tends to move the piston 393 and thereby the piston 392 to the left, augmenting the action of the spring 417 in moving the piston 392 in this direction. The modulated TV pressure in conduit 387 is supplied through the port 399 of the compensator valve 170 to the land faces 407b and 408a of the piston 392. The land face 408a is of greater area than the face 407a, and the modulated TV pressure which varies with accelerator depression thus provides a force on the piston 392 varying with the degree of accelerator depression tending to move the piston 392 to the right against the action of the spring 417 and the piston 393.

The compensator valve 170 is also a regulator valve, and it functions to provide a regulated compensator pressure in conduits 420 and 419 that decreases with increased throttle openings and increases with increased speed of the shaft 26 and of the vehicle. In its regulating condition, the valve piston 392 meters line pressure from the conduit 418, the port 403 and the groove 415, between its land 410 and a side of the port 404 into the conduits 420 and 419. Increased governor pressure in the conduit 290 applied to the piston 393 tends to augment the action of the spring 417 in moving the piston 392 to the left to open a greater part of the port 404 by moving the land 410 off the port, so that the fluid flow to the conduit 420 is greater. The modulated TV pressure in conduit 387 which increases with accelerator movement acts on the land faces 407b and 408a tending to move the piston 392 in the opposite direction and increasingly block the port 404 with the land 410. The compensator pressure in conduit 420 is also effective on the land end 407a of the piston 392 through the conduit 421, and this pressure acts in the same manner as the modulated TV pressure in tending to move the piston 392 to the right to further close the port 404. These four forces on the piston 392, namely, those due to the governor pressure in conduit 290, the spring 417, the modulated TV pressure on land faces 408a and 407b and the compensator pressure on land face 407a balance each other so as to produce the compensator pressure in conduit 419 that decreases with increased throttle opening and increases with the speed of the driven shaft 26 and of the vehicle, the fluid into the conduit 420 for the regulating conditions of the piston 392 being metered past the land 410 and a side of the port 404.

When the vehicle begins to move, after the accelerator 361 has been moved toward its open throttle position to increase the speed and power output of the engine 363, the rear pump 161 begins its pumping action and draws fluid through the conduit 192 from the sump 184 and discharges it into the conduit 193. The check valve 220 remains closed until the pressure of the fluid discharged by the rear pump 161 increases to a sufficient value to overcome the forces due to the line pressure and the spring 224, and at this time the check valve 220 opens and the rear pump discharges into the conduit 216. The fluid flow through the conduit 219 then reverses and closes the check valve 225. The closing of the check valve 225 blocks discharge by the front pump 160 into the line pressure conduit 216 and its connected conduits, and the rear pump now becomes the sole supply of line pressure for conduit 216 and connected conduits. Since the check valve 225 is closed, the rear pump 161 cannot discharge through the conduits 219 and 183 and the port 203, and the discharge from the rear pump 161 must be taken care of in another way. When the check valve 225 closes, the line pressure in conduit 216 increases slightly and is impressed on the land faces 205a and 206a of unequal area through the passage 215 and moves the valve piston 194 slightly to the right so as to provide an outlet for the excess fluid discharge from the rear pump between an edge of the port 201 and the land 207. The line pressure is now regulated exactly as has been previously described, except that it is slightly higher in value and is metered between the land 207 and an edge of the port 201 instead of between an edge of the port 203 and the land 208. The port 203 is substantially completely opened by the land 208 in the moved position of the valve piston 194, and the front pump 160 now discharges against only the pressure in the conduit 217 and in the converter 30 which is substantially less than line pressure. The front pump now functions solely to supply fluid under pressure to the converter 30, and the rear pump, as has been described, is the sole supply of line pressure in the conduit 216, while the excess fluid discharged from the rear pump escapes between an edge of the port 201 and land 207 for augmenting the fluid supply for the converter.

The compensator pressure in conduit 419, which is in general less than line pressure when the vehicle is being started, causes a change in the line pressure regulating action of the primary main regulator valve 162 as compared with its operation when the accelerator is in its closed throttle position and the vehicle is stationary. As has been previously explained, the pressure in conduits 419 and 218 tends to move the regulator valve piston 194 to the right against its spring 214, and this tends to more fully open the port 201 to vent the pressure supply line 216 after the check valve 225 has closed, as above described, or more fully open the port 203 to vent the conduit 216 before closure of the check valve 225. When the pressure in conduits 419 and 218 is reduced from full line pressure, the valve piston 194 tends to move to the left under the influence of its spring 214, since the pressure on the land faces 208a and 209a tending to move the piston 194 to the right is decreased, and the piston 194 will not move to open the supply conduit 216 through the port 201 or 203 until a higher pressure is reached in the conduit 216. The piston 194 thus maintains the line pressure in the conduit 216 at a higher value corresponding to the decreased pressure in conduits 419 and 218. The line pressure, as has been previously explained, when the selector valve piston 255 is moved to its high range position, is supplied to the piston 71 for engaging the front clutch 31, and this line pressure is thus increased with accelerator depression to increase the engaging pressures of the front clutch 31 to take the additional torque from the vehicle engine which results from depression of the accelerator 361.

The front servo apply pressure on the surface 98b which is regulated by the front servo apply regulator valve 175, like line pressure, increases with opening of the vehicle engine throttle; however, the range of pressures is greater than the range of line pressures. The valve 175 tends to produce a front servo apply pressure in the conduit 526 which is less than the line pressure in conduit 467 as has been previously described. The line pressure in the conduit 467 as in other conduits connected therewith, increases with engine throttle opening, and the line pressure is impressed on the left end of the valve piston 506 and tends to move the valve piston to open the port 516 when the line pressure increases and allows the piston 506 to move to close the port 516 on decreases in line pressure so that the pressure output from the valve 175 in conduit 526 tends to increase and decrease along with line pressure. An increased effect of the accelerator 361 is put on the valve 175, the connection between the accelerator and the valve being by virtue of the connection of the port 515 in the valve 175 through the conduit 525 with the throttle pressure output from the throttle valve 168. The throttle pressure is effective on the land surfaces 519a and 520a, and since the land 520 is larger in diameter than the land 519, an increased throttle pressure due to a greater depression of the accelerator 361 has the effect of tending to move the valve pistons 506 and 507 to the right to more fully open the port 516 for increasing the front servo apply pressure in the conduit 526. The net effect of the front servo apply regulator valve 175 is thus to provide a front servo apply pressure in the conduit 526 which is considerably less than line pressure for a released throttle position of the accelerator 361 and to cause a more rapid increase of front servo apply pressure in the conduit 526 than the increase that takes place in line pressure with further opening of the engine throttle. The front servo apply pressure thus also provides an engagement of the brake 33 increasing with throttle opening to take the additional torque which results from increased throttle opening. The reduced front servo apply pressures at closed or nearly closed conditions of the engine throttle functions to provide smooth changes in drive from intermediate to high speed ratio and vice versa as will be hereinafter more fully described.

For the particular embodiment of the transmission and its controls referred to previously, the graph in Fig. 2 may be referred to for a showing of the manner in which the line pressure in conduit 216 and connected conduits varies with accelerator movement and vehicle speeds. The line pressure is shown in this graph by the surface bounded by the points 533, 534, 535, 536, 537 and 538, the surface bounded by the points 539, 535 and 534 and the surface bounded by the points 539, 540, 536 and 535. The line pressure varies inversely as compensator pressure. For all the vehicle speeds above approximately 33 M. P. H., the line pressure is at its minimum value of 75 lbs. per sq. in., being on the surface bounded by the points 533, 534, 535, 536, 537 and 538. Below this vehicle speed, the line pressure will increase with a depression of the accelerator on the surface bounded by the points 534, 535 and 539. After the line pressure has reached its maximum value for any particular speed, the value of line pressure will be found on the surface bounded by the points 539, 540, 536 and 535 and will decrease on this surface, as is apparent, with increases of vehicle speed. For the low vehicle speeds, the value of line pressure will be found on the surface bounded by the points 534, 535 and 539 or on the surface bounded by the points 539, 540, 536 and 535.

Figure 3:
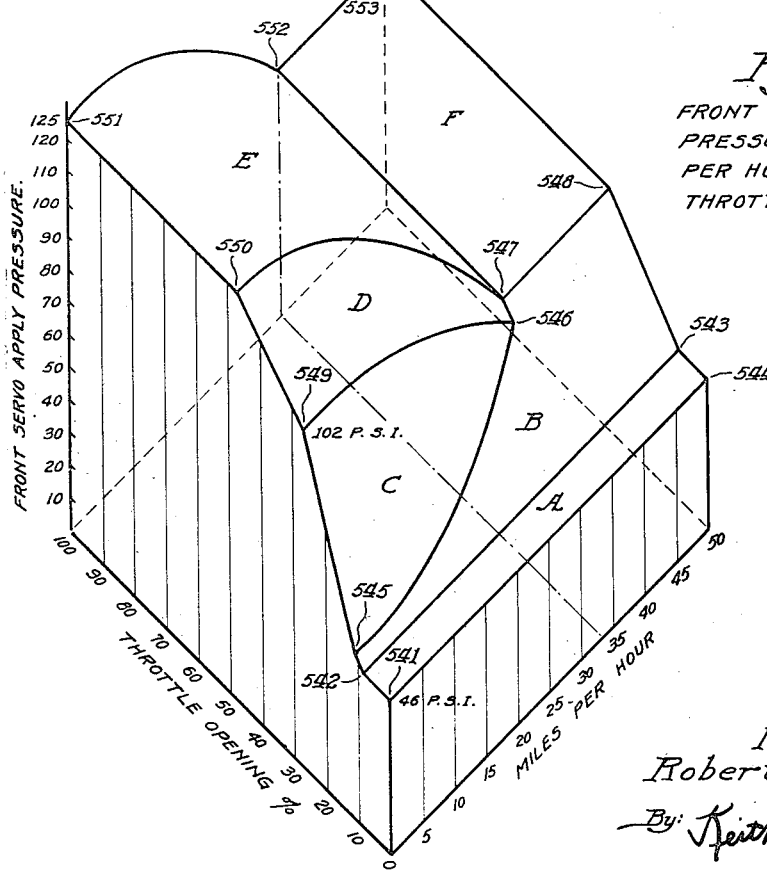
Fig. 3 is a graph showing the variations of fluid pressure applied to the piston for the second brake for engaging the brake with changes in vehicle speed and engine throttle opening.

For this particular embodiment of the transmission, the graph in Fig. 3 may be referred to for a showing of the manner in which the front servo apply pressure in the conduit 526 and applied on the surface 98b of the piston 98 for the brake 33 varies with accelerator movement and vehicle speed. The front servo apply pressure is shown in this graph by the surface A bounded by the points 541, 542, 543 and 544, the surface B bounded by the points 542, 545, 546, 547, 548 and 543, the surface C bounded by the points 545, 549 and 546, the surface D bounded by the points 549, 550, 547 and 546, the surface E bounded by the points 550, 551, 552 and 547 and the surface F bounded by the points 547, 552, 553, and 548. It will be observed that below 33 miles per hour speed of the vehicle, with opening of the engine throttle, the front servo apply pressure will increase from 46 p. s. i. which is somewhat lower than the 75 p. s. i. line pressure existing under the same conditions, over the graph surfaces B, C, D and E to the maximum value of 125 p. s. i. at about 46% carburetor opening, with zero M. P. H. vehicle speed.

The compensator pressure in conduit 419, which is reduced from line pressure for vehicle starting conditions, is effective on the secondary main regulator valve 163 for increasing the pressure in the converter 30; however, the increased discharge from the pumps 160 and 161 in itself has the effect of moving the piston 230 of the regulator valve 163 to the right. The excess discharge from the rear pump 161 flows between the land 207 of the primary main regulator valve piston 194 and an edge of the port 201 into the conduit 217, and the discharge from the front pump 160 flows through the conduit 183 and the ports 203 and 201 into the conduit 217. This increased discharge has the effect of increasing slightly the pressure in the conduit 217 and in the torque converter 30, so that this pressure impressed on the land face 242a through the conduit 252 functions to move the valve piston 230 of the secondary main regulator valve 163 to the right. In this changed position of the piston 230, the land 244 of the piston 230 opens the port 238 practically completely, and the valve meters fluid from the conduit 250 between an edge of the port 234 connected with this conduit and the land 243. It is assumed for this operation that the port 238 is connected with certain parts of the transmission for lubrication purposes, so that discharge through the port 238 is limited thereby. The metering action of the land 243 has the effect of maintaining certain pressures in the conduits 217 and 250 and in the torque converter 30. In this case, it is apparent that there is a continuous fluid flow from the conduit 217 through the torque converter 30 and thence through the converter outlet conduit 250, and this continuous fluid flow has the effect of cooling the converter and maintaining the oil within the transmission at safe operating temperatures.

Although, due to this movement of the valve piston 230, the converter pressure varies slightly with changes in output of the pumps 160 and 161, the sizable variations of converter pressure are with changes in vehicle speed and accelerator movement due to variation of the compensator pressure in conduit 419. The conduits 419 and 218 are in communication with the land faces 244a and 245a through the port 236 as has been previously described, and pressure from these conduits on these faces tends to move the piston 230 of the valve 163 to the right against the action of the spring 249. When the pressure in the conduits 218 and 419 is regulated by means of the compensator valve 170 to less than line pressure, this action on the land faces 244a and 245a decreases, so that the spring 249 is increasingly effective to block the relief port 234 or the relief port 238 so as to increase the pressure in the conduit 217 and thereby in the converter 30 connected therewith. The valve 163 regulates as before, since converter pressure is applied on the land face 242a of the piston 230 through the conduit 252, but the regulated pressure in the converter is at a predetermined higher value corresponding to the compensator pressure in the conduits 419 and 218 which is less than line pressure for starting conditions of the vehicle. The higher fluid pressure necessary for increased torque transmittal through the torque converter 30 is thus supplied to the torque converter with a depression of the accelerator 361.

The throttle pressure in conduit 332 which increases with accelerator depression is applied also to the 2–3 valve 166 and tends to hold the piston 293 of the valve, which is the actual speed changing portion of the valve, in its intermediate speed position in which it is illustrated. The throttle pressure is applied to the left end of the piston 292 and moves the piston 292 to the right against the action of the spring 326 disposed between the piston 292 and the land 316 of the piston 293. Such movement of the piston 292 causes its land 313 to uncover the port 311 and admit fluid pressure from the conduit 332, through the port 312, the port 311, the passage 331 and the port 310 to both the face 316a of the land 316 formed on the piston 293 and also on the right end of the piston 292. This fluid pressure, as it increases, tends to move the piston 292 back with the assistance of the spring 326, so that the land 313 again covers the port 311. The valve piston 292 thus meters fluid flow from the conduit 332 between an edge of the port 311 and the land 313 to provide a regulated throttle pressure in the conduit 331, and since both regulated throttle pressure and also the spring 326 are effective on piston 292, the regulated throttle pressure varies directly with the throttle pressure (in conduit 332) and is at a predetermined less value than the throttle pressure for all accelerator positions.

The regulated throttle pressure is also applied to the faces 322a and 323a of the lands 322 and 323 of the piston 294 through the conduit 330. Since the face 322a is considerably smaller in area than the face 323a, the effect of the regulated throttle pressure in the conduit 330 is to provide a force on the piston 294 tending to hold the piston against movement to the left as seen in the figure. This force acts in unison with that due to the regulated throttle pressure on the land face 316a in tending to hold the two pistons 293 and 294 from moving as a unit to the left, as is apparent.

The governor pressure in conduit 290 is applied through the conduit 329 and port 307 to the right end of the piston 294 in the 2–3 valve 166 including the land face 323b, and this pressure tends to move the piston 294 and thereby the piston 293 in contact with it to the left. The governor pressure is also applied to the faces 316b and 317a of the lands 316 and 317 respectively through the conduit 329, and since the face 316b is considerably larger than the face 317a in area, the net effect of the governor pressure applied to these faces is to tend to assist the force just described, in connection with the piston 294, in moving the piston 293 to the left against the action of the springs 325 and 326.

The valve piston 293 is the actual portion of the 2–3 valve 166 causing a change between the intermediate and high speed drives as will hereafter appear. The governor pressure impressed on the land 323 and on the lands 316 and 317 tends to move the pistons 293 and 294 to the left to move the piston 293 into a high speed drive position, and this effect of the governor pressure is opposed by the regulated throttle pressure acting on the land 316 and on the lands 322 and 323, the spring 325 acting on the piston 293, and the throttle pressure acting through the piston 292 and the spring 326 on the piston 293 all of which tends to hold the pistons 293 and 294 from movement to the left.

As the speed of the vehicle increases in second speed ratio, the governor pressure in conduit 290 increases, and this is impressed on the compensator valve 170 tending to move its pistons 293 and 392 toward the left to more fully open the port 404 and provide an increased compensator pressure in conduits 419 and 420. The increased compensator pressure in conduits 420, 419 and 218 acts on the primary main regulator valve 162 and tends to move its piston 194 farther to the right, so as to increase the opening between the land 207 and the edge of the port 201 for further relieving the line pressure in the conduit 216 and decreasing the line pressure. For the particular embodiment of the invention above referred to, Fig. 2 may be referred to for a showing of line pressure, and under these conditions, the line pressure will be found on the surface bounded by the points 539, 540, 536 and 535, and the line pressure decreases on this surface with increases in vehicle speed, as is apparent.

As has been previously described, line pressure is present in conduit 467 and is applied to the left end of the valve piston 506 of the forward servo apply regulator valve 175, and with this decrease in line pressure due to an increase in vehicle speed, the valve pistons 506 and 507 tend to move to the left under the influence of the pressure in the conduit 526 impressed through the conduit 523 on the right end of the valve piston 507 for causing a corresponding decrease in front servo apply pressure in the conduit 526, the exhaust of fluid from the conduit 526 taking place through the port 516, the groove 521 of the piston 506 and the exhaust port 512, assuming that the inherent leakage of the valve and associated parts is not sufficient in itself to cause the corresponding decrease of pressure in the conduit 526. A regulated exhaust of fluid from the conduit 526 is caused by a metering effect taking place between the right edge of the land 518 of the valve piston 506 and an edge of the port 516. For the particular embodiment of the invention above referred to, the decrease in front servo apply pressure with increases in vehicle speed are shown by the surfaces C, D and E in Fig. 3, the front servo apply pressure finally, after an increase in vehicle speed to about 33 miles per hour, being shown by the surfaces B and F, the value of which is 75 lbs. per sq. in.

As has been previously explained, the torque conversion in the hydraulic torque converter 30 generally decreases with increases in vehicle speed, and the torque transmitted through the transmission decreases similarly, so that the holding power of the various friction engaging mechanisms completing the drive, such as the front clutch 31 having line pressure maintaining it engaged and the front brake 33 having front servo apply pressure maintaining it engaged, may be decreased without slippage, and hence the line pressure and front servo apply pressure applied to engage the friction engaging mechanisms is decreased. The rear pump 161 is the sole supply of line pressure after the vehicle has started moving, and this pump thus pumps against a reduced line pressure and requires less power for driving the pump.

The increased compensator pressure in conduits 419 and 218 is applied to the secondary main regulator valve 163 and tends to move its valve piston 230 farther to the right to further open the port 234 to decrease the converter pressure in conduits 250 and 217. As has been explained, the torque conversion in the torque converter decreases generally with increases in vehicle speed, and the one-way brake 43 releases and the stator 38 begins to rotate when a one to one speed ratio through the converter 30 is approached with increases in vehicle speed and I have found that the fluid pressure required for the drive through the torque converter decreases with such decreases in torque conversion. The system thus has been designed to decrease the converter pressure with increases in vehicle speed. After the rear pump 161 has become the sole supply of line pressure, the front pump 160 is the sole supply of converter pressure, and the front pump 160 pumps against a reduced converter pressure with increased vehicle speed, resulting in a decreased power requirement for driving the front pump.

When the speed of the vehicle increases to a predetermined value, the governor pressure in conduit 290 applied to various lands in the 2–3 valve 166 increases sufficiently to overcome the effect of the throttle pressure in conduit 332 and regulated throttle pressure in conduits 330 and 331, so as to move the valve piston 293 to the left into its third speed position. As has been previously explained, the throttle pressure in conduit 332 and therefore the regulated throttle pressure in conduit 331 and connected cavities increase in accordance with throttle opening and depression of the accelerator 361. Therefore, the governor pressure must be at higher values, the greater is the accelerator depression and the greater is the throttle pressure and regulated throttle pressure, in order to overcome the effect of the throttle pressure and regulated throttle pressure and shift the valve pistons 292, 293 and 294 to the left into their third speed or direct drive positions. Thus, the vehicle speed at which an upshift occurs corresponding to this movement of these pistons is higher the greater the depression of the accelerator so that the increased torque resulting from the drive in the intermediate speed power train is available for driving the vehicle for a longer period during an acceleration of the vehicle, the greater is the torque demand by the vehicle operator as is evidenced by accelerator depression. Conversely, the less the accelerator depression and the lower the throttle pressure, the less is the governor pressure increase and vehicle speed increase necessary for shifting the 2–3 valve pistons 293 and 294 to the left into their third speed positions.

In the third speed position of the 2–3 valve piston 293, the groove 320 of the piston connects the ports 303 and 304 and thereby the conduits 269 and 86. Line pressure is thus supplied from the conduit 269, through the port 303, the groove 320, the port 304, and the conduit 86, to the piston 79 for the rear clutch 32, and the piston is moved to engage the rear clutch. Movement of the piston 293 has no effect on the front clutch, since the front clutch piston 71 remains supplied with line pressure through the conduit 83. Engagement of the rear clutch due to application of fluid pressure to its piston 79 completes the direct drive power train through the transmission.

Simultaneously with the application of fluid pressure to the rear clutch piston 79, line pressure is also supplied to the face 98a of the front brake piston 98 so as to disengage the front brake 33 and to break the intermediate speed power train through the transmission. Line pressure is supplied to the piston face 98a through the conduit 482, the port 474, the groove 478 of the 3–2 control valve piston 469 (assuming that the 2–3 valve piston 293 moves to its third speed position when the accelerator 361 is at least partially depressed), the port 473 and the conduit 481. The 3–2 control valve 173 is connected by means of the conduit 483 with the conduit 332 containing throttle pressure, and the valve 173 is thus under the control of the throttle pressure so as to be at the extreme right limit of its movement against the action of the spring 479 when the accelerator is depressed to a medium throttle position, for example, whereby the throttle pressure in the conduits 332 and 483 is at a relatively high value so as to be effective to hold the valve piston 469 at this position and to be in its illustrated position to the extreme left limit of its movement when the accelerator is at or close to its closed throttle position. In the former position, the ports 473 and 474 are connected by means of the groove 478. If the accelerator is in a released position, the flow of line pressure from the conduit 482 to the conduit 481 is through the restriction 485 for purposes presently to be pointed out. The area of the right side 98a of the piston 98 to which line pressure is applied is greater than the area of the other side 98b of the piston to which regulated front servo apply pressure is applied from the regulator valve 175 and which is generally less than line pressure so, that the effect of the line pressure on the face 98a together with the effect of the spring 99 is to cause brake disengaging movement of the piston 98.

The restriction 328 in the conduit 269 is for the purpose of causing the application of pressure on the clutch piston 79 and on the surface 98a of the front brake servomotor 103 to occur substantially at the same time. In the actual transmission, the conduit 86 to the clutch piston 79 is quite tortuous and impedes the flow of fluid therethrough to a greater extent than the conduits 481 and 482 to the piston face 98a, and the restriction 328 retards the fluid flow through the conduits to the piston face 98a and the piston 79 and assures that the pressure build up in these two motors will be substantially at the same rate. The restriction 484 in the conduit 482 is relatively quite large with respect to the restriction 328, and it has substantially no effect on this build up of pressure on the piston 79 and in the servomotor 103. As will hereinafter appear, the restriction 484 functions primarily for a change in speed ratio from third speed to second speed.

Figure 4:
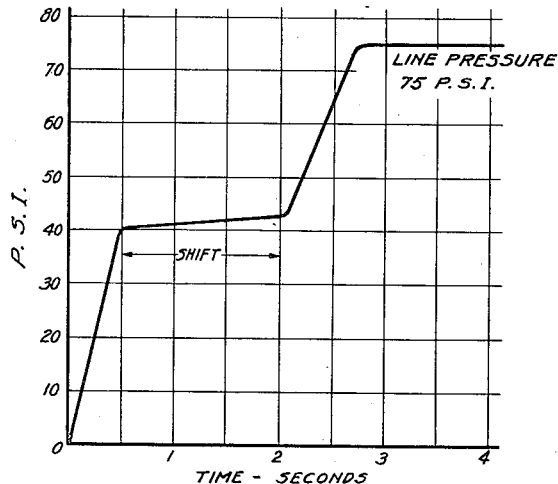
Fig. 4 is a graph showing transitory pressure variations on an apply piston for the second brake and on the second clutch in changing from second speed to third speed.

In the change from high range second speed ratio to high range third speed ratio, the servomotor 103 for the front brake 33 has an accumulator effect and cushions engagement of the rear clutch 32. This accumulator effect is modified and changed with variations in front servo apply pressure effective on the piston face 98b, and the variable accumulator effect is transitory and is over and above the effect due to changes in line pressure directly effective on the clutch piston 79 and producing the ultimate variable engaging pressure; however, most changes to third speed ratio take place when the line pressure and front servo apply pressure are at their high vehicle speed values which are 75 p. s. i. in the particular embodiment mentioned, and hence the accumulator effect of the brake motor 103 is not variable for most changes from second to third speed ratios which occur at appreciable vehicle speeds and with the accelerator in a medium or more fully open throttle position. As has been explained, when the 2-3 valve piston 293 moves to the left into its direct drive position, fluid pressure flows through the conduits 86, 482 and 481 to simultaneously disengage the front brake 33 and engage the rear clutch 32. By virtue of the orifice 328, pressure applied to the face 98a of the front brake piston 98 and pressure on the clutch piston 79 build up simultaneously for depressed positions of the accelerator 361; however, for released accelerator positions, the disengaging pressure for the brake 33 applied to the piston face 98a is slightly retarded by flowing through the restricted passage 485, inasmuch as the 3-2 control valve piston is in its illustrated position for minimum throttle openings, but this retarding effect is not significant for the upshift from second to third speed ratio drive. The manner in which the pressures on the piston face 98a and on the clutch piston 79 build up is controlled by the force on the piston 98 tending to hold it in its brake engaged position, which force is the difference between the force due to front servo apply pressure from the valve 175 applied to the face 98b of the piston 98 and the force due to the spring 99. As is illustrated with reference to Fig. 4 which applies in particular to the specific embodiment of the invention mentioned above for a change from second to third speed ratio at medium vehicle speeds and medium or greater throttle openings pressure on the piston face 98a and clutch piston 79 increases rapidly at first, for approximately a half second, with "0" time denoting the particular instant the 2-3 valve piston has moved into its direct drive position. At this time, the pressure overcomes the force holding the brake piston 98 to the limit of its movement to the right, and the piston 98 starts to move. During movement of the piston 98, between about ½ and 2 seconds as seen on the graph, the pressure applied to the piston 79 and piston face 98a increases quite gradually as seen in Fig. 4 due to the increasing fluid storage space in chamber 101 in the brake servomotor 103, and the actual transition between second and third speed drives takes place at this time during this gradual pressure increase. Since the pressure increases quite gradually at this time, the speed transition is correspondingly smooth and gradual. When the piston 98 has completed its brake disengaging movement and the speed transition has been completed, the pressure applied to the clutch piston 79 and piston face 98a increases to the full value of line pressure at the same rate as in the first ½ second.

In the event that a change from second to third speed ratio is obtained due to movement of the 2-3 valve piston 293 at lower vehicle speeds and with a closed or nearly closed throttle accelerator position, as, for example, when the vehicle is coasting down a hill or upon a sudden release of the accelerator 361 after it has previously been held in a depressed position to gain vehicle speed, the front servo apply pressure on the piston 98b is at some relatively low value, on the surfaces C or D in Fig. 3, for example, with respect to the line pressure which is applied on the opposite piston face 98a. The relatively low front servo apply pressure on the piston face 98b changes the accumulator effect in the servo motor 103 for causing an engagement of the rear clutch 32 at a decreased pressure so that its engagement is not unduly abrupt for the small amount of torque being transmitted through the transmission at this position of the accelerator. Referring to the Fig. 4 graph, with the front servo apply pressure being relatively low, the actual shift between one-half second and two seconds on the abscissa of the graph will take place at some lower pressure such as 25 to 28 p. s. i. instead of 40 to 43 p. s. i. which is illustrated. The pressure impressed on the piston face 98a and on the piston 79 for the clutch 32 increases rapidly before and after the actual shift substantially as shown in the graph; however, the actual shifting during which movement of the piston 98 takes place is at a lower pressure than is the case when both the front servo apply pressure and the line pressure are the same, and the engagement of the clutch 32 is more gradual, comparable to the decreased torque being transmitted through the transmission at this time whereby a smooth change in drive is obtained.

The transmission may be forced down in speed ratio from third speed drive to intermediate speed drive, while the transmission is driving in its high speed ratio, by moving the accelerator 361 to its forced downshift position. Movement of the accelerator 361 from its open throttle position to its forced downshift position moves the land 347 of the downshift valve piston 333 off the port 343 to open the conduit 359, which is supplied with line pressure from the conduit 216, to the conduit 327 through the groove 348 and port 344. Line pressure is thus supplied to the port 302 in the 2-3 valve 166, and fluid under this pressure enters the casing portion 295 and acts on the face 316a of the land 316 to augment the action of the springs 325 and 326. Line pressure is also supplied from the port 302 by means of the port 310, the passage 331 and the conduit 330 through the port 308 to the faces 322a and 323a of the lands 322 and 323 of the piston 294. The line pressure acting on the faces 316a, 322a and 323a moves the pistons 293 and 294 to the right into their intermediate speed positions in which they are illustrated against the action of the governor pressure applied to the land faces 316b, 317a and 323b of the lands 316, 317 and 323.

The piston 293 is its intermediate speed position functions to drain the conduit 86 and connected pistons and conduits through its groove 320, the port 305, the conduit 271, the port 259, the groove 268 of the selector valve piston 255 and the bleed port 258 to the sump 184. The clutch 32 having its piston 79 connected with the conduit 86 is thus disengaged. The front brake 33 is applied simultaneously with the disengagement of the rear clutch 32 by releasing the fluid pressure on the face 98a of the piston 98 for the brake, the fluid applied to the piston face 98a draining through the conduit 481, the port 473 of the 3–2 control valve 173, the groove 478 of the valve piston 469, the port 474, and the conduit 482 to the conduit 86. The release of fluid pressure on the piston face 98a of the piston 98 causes the piston 98 to move rearwardly against the action of the spring 99 due to the action of the front servo apply pressure remaining applied on the face 98b of the piston 98. The transmission is then again in intermediate speed drive.

The restriction 484 in the conduit 482 functions in this forced down transition by means of the accelerator to delay the application of the front brake 33 with respect to the disengagement of the rear clutch 32. The restriction 484 impedes the flow of fluid through the conduits 481 and 482 from the brake servomotor 103, while no corresponding impediment is in the conduit 86 from the rear clutch piston 79. This delayed application of the front brake with respect to disengagement of the rear clutch 32 allows the speed of the engine 363 to rise momentarily without substantial loading from the driven shaft 26 to obtain approximately the speed at which it will operate to drive the driven shaft 26 in intermediate speed drive a moment later when engagement of the front brake 33 and disengagement of the rear clutch 32 are both completed.

The transmission is also downshifted from third speed ratio to second speed ratio when the vehicle decreases below a predetermined speed, with the accelerator being in its closed throttle position. With the accelerator in this position, there is substantially no throttle pressure in the conduit 332, and the land 350 of the throttle valve piston 335 substantially blocks the port 340 supplied with line pressure. When a predetermined decreased vehicle speed is reached, the valve piston 293 of the 2–3 valve 166 moves to the right from its third speed position to its second speed position. Before this movement of the shift valve piston 293, the governor pressure in the conduit 290 and applied to the land faces 316b and 323b has been effective to hold the piston 293 in its third speed position; however, upon a decrease in vehicle speed to this predetermined speed, the governor pressure in the conduit 290 has decreased to such an extent that it is no longer sufficient acting on these land faces to hold the piston 293 in its third speed position, and the springs 325 and 326 are then effective to move the piston into its second speed position. The groove 320 in the piston 293 is then effective to drain the conduit 86 and conduit 482 for disengaging the rear clutch 32 and engaging the front brake 33 for breaking the third speed power train and completing the second speed power train similarly as for a downshift by moving the accelerator to its forced downshift position.

Although the front brake 33 is applied with an ultimate pressure (front servo apply pressure) that varies in accordance with accelerator depression and which is at a minimum corresponding to the closed throttle position of the accelerator, I have found that in order for a smooth change in drive to be made under these conditions, it is desirable to add an additional restriction to the flow of fluid from the chamber 101 in the front brake servomotor 103 for causing the brake to have a delayed application. The rear clutch 32 in driving in direct drive, with the accelerator released, is not transmitting much torque, and a complete disengagement of the clutch 32 does not take place until some time later as compared with the condition in which a third speed to second speed change takes place with the engine driving, and for this reason it is desirable to apply the brake 33 at a somewhat later time for causing a smooth completion of the second speed drive through the transmission. The conduit 86 to the rear clutch piston furthermore is quite tortuous in the actual transmission, in comparison to the actual conduits 482 and 481 which tends to retard clutch disengaging fluid flow through the conduit 86 as compared to the brake engaging fluid flow through the conduits 482 and 481, and hence the additional restriction 485 has been added for this reason also between the conduits 481 and 482 for released accelerator conditions for similarly retarding flow through these latter conduits so that the brake 33 does not engage too soon with respect to engagement of the clutch 32. In this connection I have provided the 3–2 control valve 173 which controls flow through the restricted passage 485 and adds an extra impedance to the flow of fluid through the conduits 481 and 482 when the accelerator is in its closed throttle position.

As has been previously explained, when the accelerator is in a closed throttle position, there is substantially no throttle pressure present in conduit 332. There thus is no throttle pressure effective on the land face 476a of the 3–2 control valve piston 469, and the spring 479 holds the valve piston at the limit of its movement to the left. The valve piston 469, incidentally, is moved against its spring 479 when the accelerator is given any appreciable throttle opening movement. The land 477 in this position of the valve piston blocks the port 473, and thus any fluid from the chamber 101 and passing through the conduit 481 may only escape through the restricted passage 485 into the conduit 482. Thus, under these conditions, the pressure on the face 98a of the brake piston 98 and which holds the brake 33 disengaged drains away slower than would otherwise be the case and causes a delayed application of the front brake for a smooth completion of the second speed power train through the transmission.

The transmission may also be downshifted from third speed ratio to second speed ratio when the accelerator is in a partly open throttle position, as for example when the vehicle is ascending a slight grade. The front servo apply regulator valve 175 under these conditions has the effect of providing a smooth change from third speed ratio to second speed ratio drive. The 3–2 control valve piston 469 is moved to the right against the action of the spring 479 when the accelerator is out of its closed throttle position due to the throttle pressure in conduits 332 and 483 applied to the valve piston 469, and this valve piston thus is not effective for cushioning this change in drive. Under high torque conditions, as when the accelerator is moved to its medium throttle position (see Fig. 1D) or therebeyond, the presence of line pressure (the front servo apply pressure has the value of line pressure, under these conditions) on the apply piston surface 98b provides a smooth change in drive; however, I have found that when the accelerator is only slightly depressed, as to 20% carburetor opening, for example, which is more than sufficient for moving the 3–2 control valve piston 469 into its position connecting the ports 474 and 473, it is desirable to provide additional means for smoothing the ratio change. Under these conditions, the front servo apply pressure is shown on the area C of the Fig. 3 graph which is lower than line pressure, and when the 2–3 valve piston 293 moves back into its second speed position, in which it is illustrated, due to a reduction in vehicle speed and governor pressure in conduit 290 and connected conduits, the front servo disengaging pressure impressed on the piston face 98a will drain, as in a forced downshift position of the accelerator, through the conduit 481, the port 473, the groove 478 in the 3–2 control valve piston 469, the groove 474, the conduit 482 and through the conduit 86, together with the fluid from the clutch piston 79. Due to the fact that the front servo apply pressure on the piston face 98b is reduced with respect to line pressure, the brake 33 is applied with less severity than would be the case if full line pressure were present on the piston face 98b, and the completion of the second speed drive is quite smooth, due to the functioning and presence of the front servo apply regulator valve 175 providing the reduced front servo apply pressure on the piston face 98b.

The vehicle may also be operated and started in low range. Line pressure in this case is provided solely by the front pump 160, the same as for neutral condition of the control system, it being assumed that the vehicle is just starting and is operating at too low a speed for the output pressure of the rear pump 161 to open the check valve 220 so that the rear pump 161 will discharge into the conduit 216. The manual selector valve piston 255 is moved by the vehicle operator into its "L" or low range position to condition the transmission and controls for low range operation.

The selector valve piston 255 in its "L" position connects the ports 260, 261 and 262 by means of its groove 267. The conduit 216 connected with the port 261 thus supplies pressure to the conduit 83 connected with the port 262 and also with the conduit 270 connected with the port 260. The conduit 83, similar to its function in the high range condition of the hydraulic control system, supplies fluid under pressure to the piston 71 for engaging the front clutch 31 and also supplies fluid pressure through the conduit 289 to the governor valve 165. The conduit 468 connected with the conduit 83 supplies line pressure, as in high range operation, to the 1–2 valve 172; however, in low range operation, the 1–2 valve blocks the conduit 468 and its port 460 by its land 461.

The conduit 270 connected with the port 260 is also supplied with line pressure, as has been mentioned, and this conduit is connected with the piston 113 for the rear brake 34 for applying this brake, the connection being through the conduit 502, the port 491, the groove 498 of the low inhibitor valve piston 486, the port 490, the conduit 501, the conduit 449, the port 433, the port 434, and the conduit 450 to the brake piston 113. Both the front clutch 31 and the rear brake 33 are thus applied, and the low speed power train through the transmission is completed.

Governor pressure in the conduits 290, 503 and 504, which increases with vehicle speed, is applied to the land faces 497a and 496a, providing a resultant force increasing with vehicle speed tending to shift the low inhibitor valve piston 486 to the left against the action of the spring 500; however, when the vehicle is started in low range, the governor pressure never becomes sufficient to shift the piston 486 from its illustrated position.

Line pressure is applied to the face 463a of the land 463 of the 1–2 valve piston 452 through the conduit 449. Line pressure is also applied to the land face 461a on the opposite end of the piston 452 through the conduit 468, as has been described. Since the face 463a is larger in diameter than the face 461a, the net effect of the line pressure on the two ends of the piston 452 is to hold a piston in its illustrated position to the limit of its movement to the left. Assuming the accelerator 361 is in a medium throttle position, there thus exists in the conduit 332 a throttle pressure which is regulated by the throttle valve 168. This throttle pressure is impressed on the face 439a of the land 439 on the low regulator valve piston 424 and holds the pistons 423 and 424 to the limits of their movement to the left as seen in the figure, and the valve 171 thus allows line pressure to freely flow from the conduit 449 to the conduit 450 for engaging the rear brake 34.

Line pressure is applied to the right end of the piston 368 of the TV modulator valve 169 from the conduit 501 and through the conduit 386 and port 372, assisting the spring 385 in holding the piston to the limit of its movement to the left. In this position of the piston 368, its groove 384 connects the ports 376, 375 and 374 so that throttle pressure in the conduit 332 connected with the port 375 is supplied also to the conduits 387 and 388 connected respectively with the ports 374 and 376. Throttle pressure is applied also to the face 380a of the land 380 on the TV modulator valve piston 368 through the branch conduit 389 tending to move the piston 368 to the right; however, it is not sufficient to overcome the effect of line pressure applied through the conduit 386 on the right end of the piston 368.

The throttle pressure in conduits 387 and 388 is applied to the faces 407b, 408b and 409a on the lands 407, 408 and 409 of the compensator valve piston 293, and since the land 408 is larger than the land 407 and the land 409 is larger than the land 408, the net effect of the throttle pressure on the piston 392 is to force it to the right against the action of the spring 417 to the limit of its movement in this direction. The governor pressure in conduit 290 is effective on the piston 393 tending to move it and the piston 392 to the left; however, it is not sufficient to overcome the action of the throttle pressure.

The compensator valve piston 392 under these conditions blocks line pressure from the conduit 418 and its port 403 to the port 404 and the connected compensator pressure conduit 420, and there is thus no pressure within the latter conduit. Since there is no pressure in the conduit 420 and connected conduits 419 and 218 applied to the primary main regulator valve 162, there is no counteracting action on the spring 214 of this valve from this source, and the primary main regulator valve functions to provide an increased line pressure, for example, 175 lbs. per sq. in., in the conduit 216. The secondary main regulator valve 163 functions similarly with no fluid pressure in the conduit 218 impressed on it to provide an increased fluid pressure in the converter 30, higher than any provided in high range operation of the transmission. The line pressure in conduit 216 is applied to both the piston 113 for the rear brake 34 and also to the front clutch piston 71, and hence increased engaging pressures are provided on both of these friction engaging mechanisms which is sufficient to take the increased torque and reaction for driving through the transmission in low speed ratio. As has been previously explained, for the direction of reaction on the rear brake 34 for the low speed forward drive, the brake band 104 for this brake tends to unwrap, and the torque that must be taken by the band 104 for the low speed ratio is about one and one-half times the torque impressed on the shaft 27. Due to these two facts, the relatively great engaging force on the band 104 due to the increased line pressure in conduit 216, is required for completing the low speed ratio forward drive.

Figure 5:
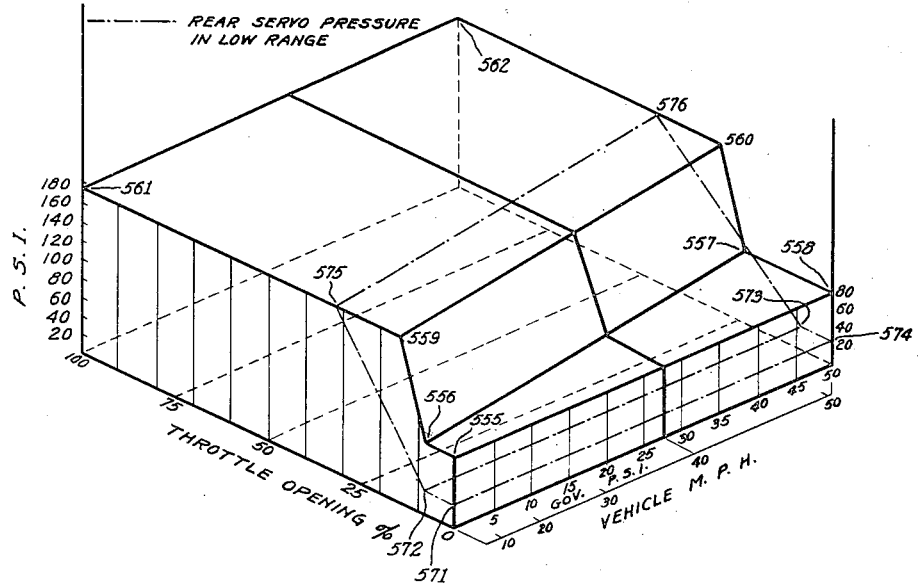
Fig. 5 is a graph showing the variations with changes in throttle opening and vehicle speed of line pressure applied to the first clutch in low range forward drive condition of the transmission.

For the particular embodiment of the invention previously mentioned, the line pressure in conduit 216 is shown graphically in Fig. 5. The line pressure may be found on the surface bounded by the points 555, 556, 557 and 558, the surface bounded by the points 556, 559, 560 and 557 and the surface bounded by the points 559, 561, 562 and 560. The line pressure, as in other cases, varies inversely as the compensator pressure. For the first portion of the accelerator movement, as to provide throttle openings between 0% and 8% at zero vehicle speed, the line pressure will remain in its minimum value of 75 lbs. per sq. in. on the surface bounded by the points 555, 556, 557 and 558. For additional throttle openings, as between 8% and 15% at zero vehicle speed, the line pressure is found on the surface bounded by the points 556, 559, 560 and 557 and the line pressure increases quickly on this surface from the minimum value of 75 lbs. per sq. in. to the maximum value of 175 lbs. per sq. in. For additional throttle openings, as from 20% to 100% at zero vehicle speed, the line pressure in low range will be found on the surface bounded by the points 559, 561, 562 and 560 and is at its maximum value of 175 lbs. per sq. in. The variations of converter pressure in low range is quite similar to line pressure but of course the pressure values are much less.

The transmission may be changed under manual control while the vehicle is traveling at relatively low vehicle speeds (below 40 M. P. H. for the particular embodiment mentioned) from high range third speed ratio to low range first speed ratio for thereby providing greater engine braking effect on the vehicle. For providing this change, the manual selector valve piston 255 is moved from its high range position to its low range position. When this change is made, the accelerator 361 is assumed to have been previously returned to its closed throttle position, and there is accordingly substantially no throttle pressure in the conduit 332. This movement of the selector valve piston 255 has the effect of blocking the port 263 from line pressure in conduit 216 and connecting the port 261 for the conduit 216 with the port 260 and the connected conduit 270. Line pressure in conduit 270 is supplied to the faces 316a and 323a of the 2–3 valve pistons 293 and 294 through the ports 345 and 344 of the downshift valve 167 and the groove 348 of the downshift valve piston 333, the conduit 327, the port 302, the port 310, the passage 331, the conduit 330 and port 308. The function of the line pressure on the land faces 316a and 323a is to move the 2–3 valve pistons 293 and 294 to the limit of their movement to the right, regardless of the value of the governor pressure acting on these pistons tending to move them in the opposite direction, and any fluid pressure in the conduit 86 may drain to the sump through the ports 304 and 305 of the 2–3 valve 166, the groove 320 of the 2–3 valve piston 293, the conduit 271, the port 259 of the manual valve 164, the groove 268 of the manual valve piston 255 and the bleed port 258 of the manual valve 164. The conduit 86 is connected with the piston 79 for the rear clutch 32, and this clutch is thereby disengaged.

The line pressure in conduit 83 is continued to be supplied to the piston 71 for the front clutch 31 for maintaining the clutch engaged, and the line pressure from conduit 83 is supplied through the conduit 289 to the governor valve 165. The conduit 468 carries line pressure from the conduit 83 to the 1–2 valve 172; however, the conduit 467 connected with the brake applying side 98b of the piston 98 in the servo-motor 103 for the front brake 33 is blocked with respect to the conduit 468 carrying line pressure, and the conduit 467 is drained by the 1–2 valve 172, as will now be described.

The low inhibitor valve is governor pressure conscious as has been previously described, and below the critical governor speed (40 M. P. H. for the particular embodiment of the invention mentioned), the low inhibitor valve piston 486 is in its illustrated position, being held in this position by the spring 500. The low inhibitor valve piston thus supplies line pressure from the conduits 270 and 502, through the port 491, the piston groove 498 and the port 490 to the conduit 501.

The line pressure in conduit 501 is applied through the conduit 449 and port 459 of the 1–2 valve 172 to the land face 463a of the 1–2 valve piston 452. Line pressure from the conduit 468 supplied from the conduit 83 and port 252 is applied through the port 460 to the opposite land face 461a; however, since the land 463 is larger in diameter than the land 461, the 1–2 valve piston 452 is moved to the left to the limit of its movement. In this position, the 1–2 valve piston 452 blocks the port 460 with respect to the port 456, so that the line pressure in conduit 468 is blocked from the conduit 467, and fluid is drained from conduit 467 through port 456 of the 1–2 valve 172, the groove 464 of the 1–2 valve piston 452, and the bleed port 457. Thus fluid pressure is drained from both sides of the brake piston 98, and this brake remains disengaged due to the action of the spring 99 in making the manually controlled change from high range direct to low range first speed drive.

The line pressure supplied to conduits 501 and 449 through the low inhibitor valve 174 from the conduit 270 is also supplied to piston 113 for the rear friction brake 34 after being regulated to a lower value by the low regulator valve 171 with the accelerator 361 being released. As has been explained, there is no throttle pressure in the conduit 332 with the accelerator 361 in its closed throttle position, and there is thus no fluid pressure applied to the land face 439a of the low regulator valve piston 424 tending to hold the piston 424 to the limit of its movement to the left. The line pressure in conduit 449 is supplied through the port 433 to the right end of the low regulator valve 171, and the fluid flows through the port 434 and conduit 450 to the brake piston 113 in the servomotor 116 and acts to move the piston in a brake engaging direction against the action of the spring 115. The same pressure in the conduit 450 which is applied to the brake piston is also supplied through the port 432, the conduit 445 and the port 429 to the land face 436a on the low regulator valve piston 423 and tends to move the piston 423 and thereby the piston 424 to the right to move the land 441 to block the port 434. The valve piston 424 thus has a regulating action, similar to the regulating action of the other regulator valves including the primary main regulator valve 162, providing regulated rear servo brake pressure in the conduit 450 which is at some predetermined lower value than the line pressure in conduits 501 and 449 and which varies along with the line pressure. This reduced fluid pressure on the piston 113 for the rear brake 34 provided under these circumstances assures that the rear brake 34 will be applied with an engaging pressure which is reduced with respect to the pressure used on the brake 34 when the accelerator is in some open throttle position.

The rear brake 34 wraps or is self-energizing for the direction of reaction on it for providing the reverse drive through the transmission from the drive shaft 25 to the driven shaft 26, and the brake is unwrapping or self-deenergizing for the direction of reaction on it for the low speed forward drive from the drive shaft 25 to the driven shaft 26. With the accelerator 361 released and a change being made from third speed ratio to first speed ratio, the vehicle tends to drive the engine 363 through the transmission from the driven shaft 26, and when the brake 34 is engaged to complete the low speed forward drive, the direction of reaction on the brake is the same as for reverse drive, and the brake 34 wraps and would engage too abruptly if line pressure were applied to the brake under these conditions. The pressure applied to the brake 34 has thus been regulated by the low regulator valve 171 for reducing the applying pressure of the brake under these circumstances for providing a smooth, gradual completion of the low speed power train.

The restriction 505 in the conduit 501 restricts the flow of line pressure through the conduits 501 and 449 and reduces the initial rate of increase of fluid pressure in the latter conduit, and it thereby reduces the initial rate of increase of regulated rear servo brake pressure in conduit 450 which is regulated by the low regulator valve 171. The restriction 505 thus acts in conjunction with the low regulator valve in providing a gradual engagement of the brake 34 and consequent gradual completion of the low speed forward drive power train.

As the accelerator is moved toward open throttle position after the movement of the selector valve 255 and the change in speed ratio have been completed to drive the vehicle in first speed, the resulting throttle pressure in conduit 332 acting on the land face 439a of the low regulator valve piston 424 will cause the piston to move to the limit of its movement to the left as seen in the figure out of its pressure regulating position, and the pressure on the piston 113 for the rear brake will be increased to line pressure. Furthermore, the throttle pressure will be applied to the compensator valve 170 through the conduits 387 and 388, moving the compensator valve to a non-regulating position and blocking compensator pressure to conduits 420 and 218, whereby both the fluid pressure in the converter 30 and also the line pressure in conduit 216 and connected conduits and applied to the rear brake piston 113 and front clutch piston 71 will be increased.

For the particular embodiment of the invention above referred to, Fig. 5 may be referred to for an illustration of the manner in which the regulated rear servo brake pressure in conduit 450 varies with vehicle speed and accelerator movement. The regulated rear servo brake pressure may be found on the surface bounded by the points 571, 572, 573 and 574, the surface bounded by the points 572, 575, 576 and 573, and on the surface bounded by the points 575, 561, 562, and 576. At zero vehicle speed, for example, it will be observed that between 0% and approximately 8% throttle opening, the regulated rear servo brake pressure is constant at a minimum value of about 24 lbs. per sq. in. and is found on the surface bounded by the points 571, 572, 573 and 574. For a throttle opening between 8% and about 30%, this pressure is found on the surface bounded by the points 572, 575, 576 and 573 and increases from about 24 lbs. per sq. in. to 175 lbs. per sq. in. For greater throttle openings, the pressure in conduit 450 is the same as line pressure, being at a maximum of 175 lbs. per sq. in., and during this range of throttle openings, the low regulator valve 171 ceases to regulate, and line pressure flows from the conduit 449 freely to the conduit 450. As is illustrated in Fig. 5, the greater the vehicle speed, the greater must be the throttle opening for the regulated rear servo brake pressure to reach its maximum value of line pressure.

The transmission may be changed from high range to low range by means of the manual valve 164 above the critical vehicle speed of the low inhibitor valve 174 which may be, for example, 40 M. P. H., and the latter valve functions to cause a change in speed ratio from third speed to second speed instead of first speed, so that the braking effect by the engine is not too severe in suddenly reducing the vehicle speed.

The low inhibitor valve piston 486 is responsive to the governor pressure in conduits 290 and 503 and shifts from its position at the limit of its movement to the right to the limit of its movement to the left against the action of its spring 500 at the critical vehicle speed. The governor pressure in conduits 290 and 503 is impressed through the port 492, port 493, conduit 504 and port 495 on the faces 497a and 496a of the piston 486 and since the right end is considerably larger in area than the other end, the governor pressure exerts a force on the valve piston tending to move it to the left against the action of its spring 500.

When the manual selector valve piston 255 is moved from its "H" position to its "L" position, the piston 255 connects the line pressure supply port 261 with the adjacent ports 260 and 262. The port 262 connected with the conduit 83 supplies pressure to the front clutch 31 for engaging this clutch, to the governor valve 165 through the conduits 83 and 289 and to the 1–2 valve 172 through the conduit 468. The conduit 270 connected with the port 261 supplies line pressure to the low inhibitor valve 174 by means of the conduit 502 and to the downshift valve 167 and through the latter valve to the 2–3 valve 166 by means of the conduit 327. The 2–3 valve pistons 293 and 294 are moved by line pressure into their second speed positions in the same manner as in the former case when the selector valve piston 255 was moved from its "H" to its "L" position below the critical governor speed. The piston 293 of the 2–3 valve functions as in the former case to drain the conduits 86 and 482 to the sump 184 for disengaging the rear clutch 32 and for draining the fluid pressure applied to the disengaging side 98a of the brake piston 98 through the groove 320 of the valve piston 293.

With the vehicle speed being above the critical vehicle speed for the low inhibitor valve 174, the inhibitor valve piston 486 is moved to the limit of its movement to the left and its land 497 blocks the port 491 for the conduit 502. The low inhibitor valve thus does not function to supply fluid pressure through the conduits 501 and 449 to the 1–2 valve 172 or to the low regulator valve 171. Since the low inhibitor valve does not supply fluid pressure to the land face 463a of the 1–2 valve piston 452, the pressure in the conduit 468 which is supplied through the port 460 to the face 461a of the 1–2 valve piston 452 holds the 1–2 valve piston 452 to the limit of its movement to the right so that the ports 460 and 456 are connected. The line pressure in the conduit 468 thus is supplied to the front servo apply regulator valve 175, and this valve functions, as has been previously described, to provide a regulated pressure within the chamber 102 and on the surface 98b of the valve piston 98. The piston 98 is thus moved to the right against the action of its spring 99 so as to engage the front brake 33. Since the front clutch 31 and the front brake 33 are now engaged the transmission is driving in second speed drive.

Assuming that the accelerator is in substantially released or throttle closing position when this change in drive is made, there is substantially no throttle pressure present in the conduits 332 and 525, and the front servo apply regulator valve functions to materially decrease the pressure supplied from the conduit 467 through the conduit 526 to the surface 98b of the front brake piston 98 for providing a gradual engagement of the front brake 33. If the accelerator is in an open throttle position, there is substantial throttle pressure present in the conduits 332 and 525, and, under these conditions, the front servo apply regulator valve 175 has substantially no regulating function and line pressure is supplied from the conduit 467 to the conduit 526 and to the piston 98 for giving a more severe engagement of the front brake 33, so that the brake may take the increased reaction resulting from the open throttle condition. The graph of Fig. 3 may be referred to for an illustration of the front servo apply pressure in the conduit 526 under the various conditions of vehicle speed and throttle opening.

The transmission may be changed from high range second speed ratio to low range first speed ratio by moving the selector valve piston 255 from its "H" position to its "L" position, assuming that when the vehicle is traveling in the high range, the vehicle speed is not sufficient to cause an upshift from second speed ratio to third speed ratio. It may be assumed that the change in drive is made after the accelerator 361 has been released to its closed throttle position.

The manual selector valve piston 255 when in its "L" position connects the ports 262, 261 and 260 by means of the groove 267 and supplies line pressure to the conduit 83 connected with the port 262 and the conduit 270 connected with the port 260. Line pressure in the conduit 83 is supplied to the front clutch 31 to keep it engaged, to the governor valve 165 and the 1–2 valve 172, and the line pressure in the conduit 270 is supplied to the low inhibitor valve 174, the TV modulator valve 169 and the 1–2 valve 172 through the low inhibitor valve, the downshift valve 167 and through the latter valve to the 2–3 valve 166.

The line pressure admitted to conduit 270 by the manual selector valve piston 255 flows, as when a similar change is made from third speed to first speed, through the conduit 502, the low inhibitor valve 174, the conduit 501, the conduit 449 to the right end of the 1–2 valve 172 and through the low regulator valve 171 and the conduit 450 to the piston 113 for the rear brake 34. The pressure in conduit 450 is regulated as previously described by the low regulator valve 171. Since the transmission has previously been in second speed ratio, there has been no pressure on the disapply side 98a of the piston 98 in the servomotor 103 for the front brake 33, as there is for high speed drive through the transmission, and a disengagement of the front brake 33 for braking the second speed power train is obtained by draining the cavity 102 in the servomotor 103 for the change from high range second speed ratio to low range first speed ratio.

The 1–2 valve 172 functions to cause a certain variable overlap between the engagement of the front brake 33 completing the second speed drive and the rear brake 34 completing the low speed drive and acts as means in addition to the low regulator valve 171 and the restriction 505 for obtaining a smooth and gradual change from second speed ratio to first speed ratio. As has been previously explained, the restriction 505 in the conduit 501 restricts the flow of line pressure through the conduits 501 and 449 and controls the initial rise of regulated rear servo brake pressure in the conduit 450 which is decreased from line pressure by the low regulator valve 171.

The pressure in conduit 449, which, on the movement of the selector valve 255, increases from zero to full line pressure gradually due to the restriction 505, is applied through the port 459 on the right end of the piston 452, and line pressure without this variation continues to be applied through the conduit 468 to the left end of the 1–2 valve piston 452 in the same manner as in the second speed condition of the controls, and until the 1–2 valve piston 452 shifts to the limit of its movement to the left the ports 456 and 460 supply the line pressure from the conduit 468 to the conduit 467 and the front servo apply regulator valve 175. A pressure is supplied by the latter valve, reduced from line pressure and variable with it as previously described, through the conduit 526 to the brake apply side 98b of the brake piston 98 for maintaining the second speed brake 33 engaged. When the pressure in the conduits 501 and 449 which is applied to the right end of the 1–2 valve piston 452 through the port 459 increases under the control of the restriction 505 to a predetermined value corresponding to a predetermined increase in regulated rear servo brake pressure in the conduit 450 and a predetermined partial engagement of the rear brake 34, the force due to the pressure on the right end of the piston 452 tending to move the piston 452 to the left becomes greater than the force due to the line pressure impressed on the left end of the piston tending to hold the piston 452 to the limit of its movement to the right, and the 1–2 valve piston 452 shifts to the left to the limit of its movement and blocks the port 456 with respect to the line pressure supply port 460. Upon this shift of the 1–2 valve piston 452, the conduit 467 connected through the front servo apply regulator valve 175 to the apply side 98b of the brake piston 98 is connected to drain through the groove 464 of the 1–2 valve piston 452 and through the port 457 of the 1–2 valve, and disengagement of the brake 33 is initiated. Thus, it will be apparent that the 1–2 valve 172 functions to start disengagement of the front brake 33 by draining the conduit 467 to the sump 184 at a time when the rear brake 34 has reached a predetermined engagement. Disengagement of the second speed brake continues until complete, and engagement of the low speed brake 34 continues from the partial engagement at which disengagement of the brake 33 is begun until engagement of the brake 34 is complete, and the brakes 33 and 34 thus overlap in engagement.

The 1–2 valve piston 452 shifts from its second speed position at the limit of its movement to the right to its first speed position at the limit of its movement to the left to initiate disengagement of the front brake 33 at different fluid pressures on its right end corresponding to different regulated rear servo brake pressures and different engagement of the brake 34, depending on variations in line pressure impressed on its left end. As has been hereinbefore explained, the line pressure varies both with the vehicle speed and with the position of the accelerator 361. The line pressure increases with accelerator depression and decreases with increases in vehicle speed. The pressure on the right end of the 1–2 valve piston 452 before it shifts to the left must increase to a greater value corresponding to a greater regulated rear servo brake pressure and a greater engagement of the brake 34, the higher the line pressure is that is impressed on the left end of the piston 452. Thus, the greater the depression of the accelerator 361 is with a resultant higher line pressure, the greater must be the engagement of the rear brake 34 before initiation of engagement of the front brake 33 occurs with a shift of the 1–2 valve piston 452. The greater the vehicle speed of the vehicle is, the less must be the pressure on the right end of the piston 452 and consequently the less the engagement of the rear brake 34 must be before the 1–2 valve piston 452 shifts to initiate disengagement of the front brake 33. Thus, the overlap of engagement of the brakes 33 and 34 is increased with accelerator depression and is decreased with increases in vehicle speed. The 1–2 valve 172 is constructed to operate in this fashion, since, the greater the depression of the accelerator is, the greater in general is the torque transmitted through the transmission, and the greater will be the tendency for the engine 363 to operate without restraint and hence the overlap between the brakes 33 and 34 is increased, while the arrangement still provides a smooth change in drive from the second speed ratio to the first speed ratio. The greater the vehicle speed is, the less in general will be the torque conversion in the hydraulic torque converter 30 and the less will be the torque transmitted through the transmission. Hence the overlap of engagement between the brakes 34 and 33 is decreased with increases in vehicle speed by the 1–2 valve 172 while still providing the desirable smooth change in drive from second speed ratio to first speed ratio. The 1–2 valve 172 thus provides an overlap between the engagements of the brakes 33 and 34 that varies with accelerator depression and vehicle speed, providing a smooth change from second speed drive to first speed drive under all conditions.

A change from low range first speed to high range second speed by a movement by the manual valve piston 255 from its "L" to its "H" positions may be made below a predetermined vehicle speed, for example, 15 M. P. H. In this case, the conduits 449, 501, 502 and 270 are drained to the sump through the port 260, the groove 268 and the port 258 of the manual selector valve 164, and the 1–2 valve piston 452 will not shift to the right to commence engagement of the second speed brake 33 until the pressure applied to the right end of the 1–2 valve piston 452 and the corresponding regulated rear servo brake pressure in conduit 450 and the pressure of engagement of the first speed brake 34 decreases to predetermined values. On such a decrease in fluid pressure applied to the right end of the 1–2 valve piston 452, the line pressure applied to the left end of the 1–2 valve piston 452 overcomes the force due to the declining pressure on the right end of the piston 452, and the 1–2 valve piston 452 moves to the right to the limit of its movement and connects the line pressure in the conduit 468 with the conduit 467 connected with the apply side 98b of the brake piston 98 through the front servo apply regulator valve 175 to commence application of the brake 33. The front servo apply regulator valve 175 reduces and regulates the pressure applied to the brake piston 98 to a lower value with respect to line pressure, but these two pressures increase and decrease together as has been previously described and as is apparent from a comparison of the Fig. 2 and Fig. 3 graphs. The line pressure varies, as has been mentioned above, and the values of the declining pressure on the right end of the 1–2 valve piston 452 and the resultant engagement of the low speed brake 34 vary also before a shift from the low speed position to second speed position of the piston 452 occurs. The line pressure increases with accelerator depression and decreases with increases in vehicle speed, and accordingly, the fluid pressure on the right end of the 1–2 valve piston 452 is at a higher value with a resultant higher engaging pressure of the brake 34 with a depressed accelerator position and is at a comparatively lower value with a corresponding lower engaging pressure of the brake 34 with higher vehicle speeds before the 1–2 valve piston moves from its first speed position to its second speed position to initiate engagement of the second speed brake 33. The 1–2 valve in this case thus also provides an overlap of engagement between the brakes 33 and 34 which varies with line pressure and with accelerator depression and vehicle speed and works for a desirably smooth gradual change from the low speed drive to the second speed drive under all conditions.

Reverse drive through the transmission is obtained by moving the selector valve piston 255 into its "R" position. The selector valve piston 255 in its "R" position connects the ports 259, 260 and 261 by means of its groove 268. Line pressure exists in the conduit 216 connected with the port 261 and is supplied through the ports 260 and 259 to the conduits 270 and 271 respectively. The line pressure in conduit 216 is provided solely by the front pump 160, since in reverse drive the gears 186 and 187 of the rear pump 161 rotate in the reverse direction tending to pump any fluid in the conduit 193 back into the sump 184 through the conduit 192. The check valve 220 in the conduit 193 is closed and prevents any such pumping by the pump 161. The front pump 160 acts in substantially the same manner in the reverse condition of the hydraulic control system as in the neutral condition of the system in constituting the sole supply of line pressure for the conduit 216 and connected conduits. The primary main regulator valve 162 functions as in the neutral condition of the transmission for regulating the line pressure in conduit 216, and the secondary main regulator valve 163 functions as in the neutral condition of the transmission to regulate the fluid pressure in the hydraulic converter 30. For open throttle conditions, there is substantially no fluid under pressure in the compensator conduits 420, 419 and 218, as will be described, and the regulator valves 162 and 163 function as has been described in connection with the low range condition of the controls to provide maximum line pressure and a maximum pressure in the converter.

Line pressure in the conduit 270 is supplied to the low inhibitor valve 174 and the downshift valve 167 and to the TV modulator valve 169, the 1–2 valve 172 and the low regulator valve 171 through the conduit 502, the low inhibitor valve 174 and the conduits 501, 449 and 386, as has been described in connection with the low range conditions of the hydraulic control system. The application of line pressure to the right end of the TV modulator valve piston 368 augments the action of the spring 385 in holding the valve piston to the limit of its movement to the left, so that its groove 384 connects the ports 374, 375 and 376.

The throttle valve 168 functions as before to provide a throttle pressure in the conduit 332 and connected conduits which increases with throttle opening. This throttle pressure is supplied to the land faces 407b, 408a, 408b and 409a of the compensator valve piston 392 through the ports 374, 375 and 376, the conduits 387 and 388 and the ports 309 and 400, tending to move the compensator valve piston 392 to the right against the action of the spring 417. At low throttle pressures corresponding to only slight depressions of the vehicle accelerator 361, the valve piston 392 connects the ports 403 and 404 substantially without restriction to provide line pressure from the conduits 216 and 418 to the conduits 419 and 420, and as the throttle pressure becomes greater, the valve piston 392 is moved more and more to the right so that it has a regulating action and provides a decreasing compensator pressure within the conduit 419. The compensator pressure is impressed on the land face 407a for providing this regulating action as has been previously described. At greater depressions of the accelerator 361, the throttle pressure in the conduit 332 is greater, and the lands 410 and 411 of the piston 392 block the line pressure port 403 of the compensator valve 170 from the port 404 of the valve connected with the compensator conduits 420 and 419, and there thus exists no compensator pressure in the conduits 419 and 420. The line pressure in the conduit 216 is regulated by the primary main regulator valve 162 to increasing values with decreasing values of compensator pressure, and the pressure in the converter 30 is regulated by the secondary main regulator valve 163 similarly as has previously been described.

In view of the fact that throttle pressure is impressed on both of the land faces 408a and 409a, the same as in low speed forward drive, the compensator pressure in the conduits 420 and 419 decreases rapidly with throttle opening in the same manner as in low speed forward drive. The action of the compensator valve 170 in low range condition of the vehicle however, is unlike its action in reverse drive in that for reverse drive there is no governor pressure present in the conduit 290 tending to cause the compensator valve to regulate at higher vehicle speeds. This is due to the fact that, in the reverse position of the selector valve piston 255, the conduits 83 and 289 for feeding line pressure to the governor 165 are not connected with the conduit 216 constituting the source of line pressure. The speed of the vehicle thus has no effect on the compensator pressure in the conduits 419 and 420 and has no effect on the line pressure in conduit 216 and the converter pressure in conduit 217, and the line pressure and converter pressure remain at maximum values with an open throttle condition regardless of increases in vehicle speed.

Line pressure is applied from the port 260, through the conduits 270 and 502, the low inhibitor valve 174 and the conduits 501 and 449 to the right end of the low regulator valve 171 and tends to move the low regulator valve piston 424 to the limit of its movement to the left as seen in the figure. Throttle pressure is applied through the conduits 332 and 451 to the land face 439a of the low regulator valve piston 424, and the action of the low regulator valve in providing a reduced pressure within the conduit 450 applied to the piston 113 for the rear brake 34 is similar to its action in low range forward drive. Since however, the line pressure in reverse drive does not vary with vehicle speed, the variation of the rear servo brake pressure for the rear brake piston 113 also does not vary with vehicle speed as it does in low speed forward drive.

Line pressure from the selector valve 164 in the conduit 271 flows through the port 305 for the 2–3 valve 166, the groove 320, the port 304 and the conduit 86 to the piston 79 for the rear clutch 32 for applying this clutch. Line pressure in conduit 86 also, incidentally, flows through the conduit 482, the port 474, the groove 478 of the 3–2 control valve piston 469, the port 473 and the conduit 481 to the disapply side 98a of the brake piston 98; however, since there is no pressure on the opposite, apply side 98b of the piston 98, this pressure has no particular function inasmuch as the spring 99 also is effective for maintaining the front brake 33 disengaged.

The line pressure in reverse drive as for the other drives varies inversely with compensator pressure. The line pressure for reverse drive for all vehicle speeds is the same as for low range forward drive at zero vehicle speed and may be seen from the graph in Fig. 5. Referring to this figure, the line pressure for reverse drive for the particular embodiment of the invention referred to, regardless of vehicle speed, remains at its minimum of 75 lbs. per sq. in. on the line between the points 555 and 556 for throttle openings between 0% and 8% and increases from its minimum value of 75 lbs. per sq. in. to its maximum value of 175 lbs. per sq. in. on the line between the points 556 and 559 for throttle openings between 8% and 15%, and it remains constant at its maximum value of 175 lbs. per sq. in. on the line between the points 559 and 561 for additional throttle openings. The converter pressure also varies inversely as the compensator pressure and would be shown by a similar graph but having different fluid pressure values.

The rear servo brake pressure for reverse drive also has no variation with vehicle speed and is illustrated by the line joining the points 571, 572, 575 and 561 in Fig. 5. Between 0% and 8% for the particular embodiment of the invention referred to, the rear servo brake pressure is at its minimum value of 24 lbs. per sq. in. Between 8% and about 30% it increases gradually to its maximum value of 175 lbs. per sq. in. and for greater throttle openings it remains at its maximum value of 175 lbs. per sq. in.

Due to the fact that the initial rear servo pressure is at the reduced value of 24 lbs. per sq. in., instead of the line pressure value of 75 lbs. per sq. in., there is not an unduly great shock transmitted to the driving wheels of the vehicle when the manual selector valve piston 255 is moved into its "R" position for completing the reverse drive power train with the accelerator 361 released in which accelerator position such an operation is generally performed, the engagement of the rear brake 34 being relatively gradual and smooth.

The improved transmission controls advantageously provide smooth changes in drive between the second and third forward drive ratios due to the fluid pressure regulating function of the valve 175. The completion of the reverse drive power train is also relatively gradual and smooth giving no undue shock to the vehicle due to the action of the low regulator valve 171 which in the improved controls herein described and illustrated is effective not only for low range forward drive but is also effective for reverse drive.

I wish it to be understood that my invention is not to be limited to the specific constructions and arrangements shown and described except only insofar as the appended claims may be so limited, as it will be apparent to those skilled in the art that changes may be made without departing from the principles of the invention.

In particular, I wish it to be understood that the invention is not at all limited to the specific values for the various pressures shown in Figs. 2, 3, 4, and 5, inasmuch as these particular values were only intended to be illustrative with respect to a certain embodiment of the invention, and the graphs in these figures show a preferred manner in which the various pressures vary with respect to each other and with respect to throttle opening and vehicle speed.

I claim:

1. In transmission mechanism for an automotive vehicle having a driving engine with a throttle, the combination of a drive shaft, a driven shaft, a hydraulic torque converter driven by said drive shaft, an accelerator for controlling the engine throttle, means for providing a forward drive power train between said torque converter and said driven shaft, means for providing a reverse drive power train between said torque converter and said driven shaft, said two last named means including a planetary gear set having a reaction element and a friction brake for the reaction element for completing both of said power trains when engaged, the reaction on said reaction element for said reverse drive power train being greater than for said forward drive power train and said brake being wrapping or self-energizing for the direction of reaction on the reaction element for said reverse drive power train and being unwrapping or self-deenergizing for the direction of reaction on the reaction element for said forward drive power train, means for engaging said friction brake with substantially the same pressure for completing both of said power trains, and a governor driven in accordance with the speed of said driven shaft, said brake engaging means being under the control of said accelerator for increasing the pressure of engagement for both of said power trains when the accelerator is moved toward an open throttle position and being under the control of said governor for decreasing the pressure of engagement for said forward drive power train on increasing speeds of said driven shaft.

2. In transmission mechanism, the combination of a drive shaft, a driven shaft, means for providing a relatively low speed power train between said shafts, means for providing a relatively high speed power train between said shafts, said low speed power train including a friction clutch and a friction brake both of which are engaged for completing the low speed power train, said high speed power train including said clutch and a second friction clutch both of which are engaged for completing the high speed power train, and means applying said brake with a less pressure than said first named clutch for making a smooth transition from said high speed power train to said low speed power train.

3. In transmission mechanism for an automotive vehicle having a driving engine with a throttle, the combination of a drive shaft, a driven shaft, means for providing a relatively low speed power train between said shafts, means for providing a relatively high speed power train between said shafts, said low speed power train including a friction clutch and a friction brake both of which are applied for completing the power train, said high speed power train including said first named clutch and a second friction clutch both of which are engaged for completing the high speed power train, an accelerator for controlling the engine throttle, and means for applying said brake with a less pressure than applied to said first clutch for making a smooth transition from the high speed power train to the low speed power train, said last named means being under the control of said accelerator for increasing the pressure applied to said first named clutch and to said brake to the same value when the accelerator is moved toward an open throttle position.

4. In transmission mechanism, the combination of a drive shaft, a driven shaft, means for providing a relatively low speed power train between said shafts, means for providing a relatively high speed power train between said shafts, said two last named means including a planetary gear set having a plurality of drive controlling elements, said low speed power train including a friction clutch for connecting one of said elements to be driven by said drive shaft and a brake for braking a second of said elements, said high speed power train including said first named clutch and an additional clutch for connecting one of said elements to be driven by said drive shaft, and means applying said brake with a less pressure than said first named clutch for making a smooth transition from the high speed power train to the low speed power train.

5. In transmission mechanism for an automotive vehicle having a driving engine with a throttle, the combination of a drive shaft, a driven shaft, an accelerator for controlling the engine throttle, means for providing a relatively low speed power train between said shafts, means for providing a relatively high speed power train between said shafts, said two last named means including a planetary gear set having a plurality of drive controlling elements, said low speed power train including a friction clutch for connecting one of said elements to be driven by said drive shaft and a friction brake for a second of said elements to cause the latter to function as a reaction element, said high speed power train including said first named clutch and an additional friction clutch for connecting one of said elements to be driven by said drive shaft, means for applying said brake with a less pressure than said first named clutch for making a smooth transition from the high speed power train to the low speed power train, and means under the control of said accelerator for increasing the pressure on said last named clutch and brake to substantially the same value on the accelerator being moved toward an open throttle position.

6. In transmission mechanism for an automotive vehicle having a driving engine with a throttle, the combination of a drive shaft, a driven shaft, an accelerator for controlling the engine throttle, a hydraulic torque converter driven by said drive shaft, means for providing a relatively low speed power train between said torque converter and said driven shaft, means for providing a relatively high speed power train between said torque converter and said driven shaft, said two last named means including a planetary gear set having a plurality of drive controlling elements, said low speed power train including a friction clutch for drivingly connecting one of said elements with said torque converter to be driven thereby and a friction brake for a second of said elements to cause it to function as a reaction element, said high speed power train including said first named clutch and an additional friction clutch for connecting one of said elements with said torque converter to be driven thereby, a governor driven in accordance with variations in speed of said driven shaft, means for initially applying said brake with a less pressure than said first named clutch for making a smooth transition from the high speed power train to the low speed power train, means under the control of said accelerator for increasing the application pressures of said first named clutch and said brake with throttle opening movement of said accelerator to raise the application pressures ultimately to substantially the same value, and means under the control of said governor for decreasing the application pressures on said first named clutch and said brake with increases in driven shaft speed.

7. In transmission mechanism for an automotive vehicle having a driving engine with a throttle, the combination of a drive shaft, a driven shaft, an accelerator for controlling the engine throttle, means for providing a power train between said shafts and including a fluid pressure applied friction engaging mechanism for completing the power train when engaged, a fluid accumulator having a piston therein, means for simultaneously applying fluid pressure to one side of said piston and to said engaging mechanism for completing said power train with said piston moving under transitorily increasing fluid pressure when said engaging mechanism is engaging to accumulate fluid in the accumulator and graduate the engagement of said friction mechanism, means under the control of said accelerator for regulating the fluid pressure applied to said piston and said friction mechanism to an utimate value that increases with throttle opening, and means under the control of said accelerator for providing a fluid pressure applied to the other side of said piston which varies within wider limits than the pressure applied to said friction mechanism for causing a smooth engagement of the friction mechanism under varying conditions.

8. In transmission mechanism for an automotive vehicle having a driving engine with a throttle, the combination of a drive shaft, a driven shaft, an accelerator for controlling the engine throttle, means for providing a relatively low speed power train between said shafts, means for providing a relatively high speed power train between said shafts, said low speed power train including a friction brake for completing the power train and said high speed power train including a friction clutch for completing the high speed power train, a fluid pressure operated piston for applying said clutch, a fluid pressure operated piston for applying said brake, means for supplying a fluid pressure simultaneously to one side of said brake piston and to said clutch piston for disengaging said brake and for engaging said clutch to change from said low speed drive to said high speed drive, means under the control of said accelerator for regulating the fluid pressure so applied to said pistons between predetermined limits and which increases with movement of the accelerator in a throttle opening direction, and means under the control of said accelerator for applying a different fluid pressure to the other side of said brake piston which varies within wider limits than the ultimate fluid pressures applied to said clutch piston whereby the brake piston functions as an accumulator and graduates the engagement of said friction clutch when a change from low speed drive to high speed drive is made with the accelerator in a relatively closed throttle position.

9. In transmission mechanism for an automotive vehicle having a driving engine with a throttle, the combination of a drive shaft, a driven shaft, an accelerator for controlling the engine throttle, means for providing a relatively low speed power train between said shafts, means for providing a relatively high speed power train between said shafts, said low speed means including a friction clutch and a friction brake both of which are applied for completing the power train, said high speed means including said first named friction clutch and a second friction clutch both of which are applied for completing the power train, pistons for applying said two clutches respectively, a piston for applying said friction brake when pressure is supplied to a first side of it and for disapplying the brake when pressure is applied to the second side of it, means for simultaneously applying fluid pressure to the piston for said second clutch and to said second side of said brake piston for changing from the low speed power train to the high speed power train, means under the control of said accelerator for regulating the ultimate pressures so applied to increase with engine throttle opening and varying within predetermined limits, and means under the control of said accelerator for applying a fluid pressure to the first side of said piston which increases with engine throttle opening and varies within wider limits than the pressure applied to said second clutch piston whereby the brake piston acts as an accumulator for providing a smooth engagement of said second clutch at approximately closed throttle positions of said accelerator.

10. In transmission mechanism for an automotive vehicle having a driving engine with a throttle, the combination of a drive shaft, a driven shaft, an accelerator for controlling the engine throttle, means for providing a relatively low speed power train between said shafts, means for providing a relatively high speed power train between said shafts, said low speed means including a friction clutch and a friction brake both of which are applied for completing the power train, said high speed means including said first named friction clutch and a second friction clutch both of which are applied for completing the power train, pistons for applying said two clutches respectively, a piston for applying said friction brake when pressure is supplied to a first side of it and for disapplying the brake when pressure is applied to the second side of it, means for simultaneously applying fluid pressure to the piston for said second clutch and to said second side of said brake piston for changing from the low speed power train to the high speed power train, means under the control of said accelerator for regulating the ultimate pressures so applied to increase with engine throttle opening and varying within predetermined limits, and means under the control of said accelerator for applying a fluid pressure to the first side of said piston which increases with engine throttle opening and varies within wider limits than the pressure applied to said second clutch piston whereby the brake piston acts as an accumulator for providing a graduated engagement of said second clutch at approximately closed throttle positions of said accelerator, said first named accelerator controlled means including a regulating valve under the control of said accelerator, and said second accelerator controlled means including a second regulator valve also under the control of said accelerator.

11. In transmission mechanism, the combination of a drive shaft, a driven shaft, means for providing a relatively low speed power train between said shafts and including a friction brake for completing the power train, means for providing a relatively high speed power train between said shafts and including a friction clutch for completing the power train, a fluid pressure operated motor mechanism for actuating said brake and including a fluid pressure operated piston having a brake apply surface and a brake disapply surface to which fluid pressure may be applied to disengage the brake with fluid pressure remaining applied to said brake apply surface, a piston for engaging said clutch when fluid pressure is applied to the piston, a source of fluid pressure, a regulator valve effectively between said fluid pressure source and said piston apply surface, said regulator valve metering fluid flow to said piston apply surface and having a surface thereon subject to the fluid pressure applied to said piston apply surface for reducing the metered flow of fluid pressure through the valve as the fluid pressure on said piston apply surface increases, and fluid conduits for connecting simultaneously said clutch piston and said brake piston disapply surface with said pressure source.

12. In transmission mechanism for an automotive vehicle, the combination of a drive shaft, a driven shaft, means for providing a relatively low speed power train between said shafts and including a friction brake for completing the power train, means for providing a relatively high speed power train between said shafts and including a friction clutch for completing the power train, a fluid pressure operated motor mechanism for actuating said brake and including a piston having a brake apply surface and a brake disapply surface to which fluid pressure may be applied to disengage the brake with fluid pressure remaining applied to said brake apply surface, a fluid pressure actuated piston for applying said clutch, a source of fluid pressure, conduits for connecting simultaneously said clutch piston and the disapply surface of said brake piston, a regulator valve for connecting said pressure source and said piston apply surface, said regulator valve metering fluid flow to said piston apply surface and having a surface thereon subject to the fluid pressure applied to said piston apply surface for reducing the fluid metering flow through the valve as the pressure increases on said brake piston apply surface, a throttle for the vehicle engine, and means effectively connecting said throttle and said regulator valve for providing a force on said regulator valve tending to open the valve and increase the metered fluid flow therethrough to said piston apply surface as the engine throttle is opened.

13. In transmission mechanism, the combination of a drive shaft, a driven shaft, means for providing a relatively low speed power train between said shafts and including a friction brake for completing the power train, means for providing a relatively high speed power train between said shafts and including a friction clutch for completing the power train, a fluid pressure operated motor mechanism for actuating said brake and including a piston having a brake apply surface and a brake disapply surface to which fluid pressure may be applied to disengage the brake with fluid pressure remaining applied to said brake apply surface, a fluid pressure actuated piston for applying said clutch, a source of fluid pressure, conduits for connecting simultaneously said clutch piston an the disapply surface of said brake piston, a regulator valve for connecting said pressure source and said piston apply surface, said regulator valve metering fluid flow to said piston apply surface and having a surface thereon subject to the fluid pressure applied to said piston apply surface for reducing the fluid metering flow through the valve as the pressure increases on said brake piston apply surface, means responsive to the speed of said driven shaft, and means effectively connecting said speed responsive means and said regulator valve so that the fluid metering flow through the regulator valve is decreased as the speed of said driven shaft increases.

14. In transmission mechanism for an automotive vehicle, the combination of a drive shaft, a driven shaft, means for providing a relatively low speed power train between said shafts and including a friction brake for completing the power train, means for providing a relatively high speed power train between said shafts and including a friction clutch for completing the power train, a fluid pressure operated motor mechanism for actuating said brake and including a piston having a brake apply surface and a brake disapply surface to which fluid pressure may be applied to disengage the brake with fluid pressure remaining applied to said brake apply surface, a fluid pressure actuated piston for applying said clutch, a source of fluid pressure, conduits for connecting simultaneously said clutch piston and the disapply surface of said brake piston, a regulator valve for connecting said pressure source and said piston apply surface, said regulator valve metering fluid flow to said piston apply surface and having a surface thereon subject to the fluid pressure applied to said piston apply surface for reducing the fluid metering flow through the valve as the pressure increases on said brake piston apply surface, a throttle for the vehicle engine, means effectively connecting said throttle and said regulator valve for increasing the metered flow through the regulator valve as the engine throttle is opened, means responsive to the speed of said driven shaft, and means effectively connecting said regulator valve and said speed responsive means for causing said regulator valve to decrease the metered fluid flow through the regulator valve as the speed of said driven shaft increases.

References Cited in the file of this patent
UNITED STATES PATENTS

| | | |
|---|---|---|
| 2,132,728 | Ford | Oct. 11, 1938 |
| 2,150,950 | Thoma | Mar. 21, 1939 |
| 2,170,856 | Dunn | Aug. 29, 1939 |
| 2,193,304 | Thompson | Mar. 12, 1940 |
| 2,195,605 | Thompson | Apr. 2, 1940 |
| 2,220,174 | Ravigneaux | Nov. 5, 1940 |
| 2,221,393 | Carnegie | Nov. 12, 1940 |
| 2,251,625 | Hale | Aug. 5, 1941 |
| 2,528,584 | Farkas | Nov. 7, 1950 |
| 2,548,208 | Evernden | Apr. 10, 1951 |
| 2,549,125 | Paton | Apr. 17, 1951 |
| 2,576,336 | Farkas | Nov. 27, 1951 |
| 2,590,280 | Swift | Mar. 25, 1952 |
| 2,636,578 | Swift | Apr. 28, 1953 |
| 2,640,373 | Jandasek | June 2, 1953 |
| 2,645,137 | Roche | July 19, 1953 |

FOREIGN PATENTS

| | | |
|---|---|---|
| 929,571 | France | Dec. 31, 1947 |